United States Patent [19]
Lan et al.

[11] Patent Number: 6,124,365
[45] Date of Patent: *Sep. 26, 2000

[54] INTERCALATES AND EXFOLIATES FORMED WITH LONG CHAIN (C6+) OR AROMATIC MATRIX POLYMER-COMPATIBLE MONOMERIC, OLIGOMERIC OR POLYMERIC INTERCALANT COMPOUNDS AND COMPOSITE MATERIALS CONTAINING SAME

[75] Inventors: Tie Lan; Ying Liang, both of Palatine; Semeon Tsipursky, Lincolnwood; Gary W. Beal, McHenry, all of Ill.

[73] Assignee: AMCOL Internatioanl Corporation, Arlington Heights, Ill.

[ * ] Notice: This patent is subject to a terminal disclaimer.

[21] Appl. No.: 08/933,680

[22] Filed: Sep. 19, 1997

Related U.S. Application Data

[63] Continuation-in-part of application No. 08/907,950, Aug. 11, 1997, which is a continuation-in-part of application No. 08/758,740, Dec. 6, 1996.

[51] Int. Cl.[7] .................................................... B01D 21/01
[52] U.S. Cl. ......................... 516/101; 524/442; 524/444; 524/445
[58] Field of Search ........................ 252/315.2; 516/101; 524/442, 444, 445

[56] References Cited

U.S. PATENT DOCUMENTS

| | | | |
|---|---|---|---|
| 4,956,121 | 9/1990 | Tymon et al. | 252/378 R |
| 5,028,351 | 7/1991 | Kato et al. | 252/315.2 |
| 5,552,469 | 9/1996 | Beall et al. | 524/445 |
| 5,910,523 | 6/1999 | Hudson | 523/213 |
| 5,952,095 | 9/1999 | Beall et al. | 428/332 |
| 5,981,029 | 11/1999 | Harada et al. | 428/143 |
| 5,994,445 | 11/1999 | Kaschel et al. | 524/444 |

FOREIGN PATENT DOCUMENTS

| | | |
|---|---|---|
| 0 619 182 A1 | 10/1994 | European Pat. Off. . |
| 0 747 451 A2 | 12/1996 | European Pat. Off. . |
| 0 780 340 A1 | 6/1997 | European Pat. Off. . |
| 281 585 A5 | 8/1990 | Germany . |
| 2 088 932 | 6/1982 | United Kingdom . |

*Primary Examiner*—Edward J. Cain
*Attorney, Agent, or Firm*—Marshall, O'Toole, Gerstein, Murray & Borun

[57] ABSTRACT

Intercalates formed by contacting a layered material, e.g., a phyllosilicate, with an intercalant surface modifier selected from the group consisting of a compound having an alkyl radical containing at least 6 carbon atoms, a compound containing an aromatic ring, and mixtures thereof, said surface modifier including a matrix material-reactive functional group, to sorb or intercalate the intercalant surface modifier between adjacent platelets of the layered material. Sufficient intercalant surface modifier is sorbed between adjacent platelets to expand the adjacent platelets to at least about 10 Å, up to about 100 Å. The intercalated complex can be combined with an organic liquid into a viscous carrier material, for delivery of the carrier material, or for delivery of an active compound; or the intercalated complex can be combined with a matrix polymer to form a strong, filled polymer matrix.

24 Claims, 7 Drawing Sheets

FIG. 1 ⊖Na ⊖Mg ○Al ○x○ ⊘Si

FIG. 5
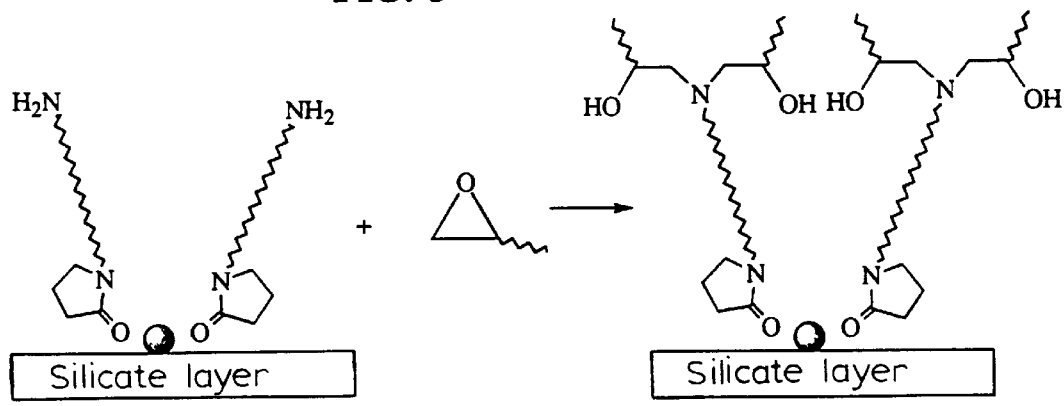
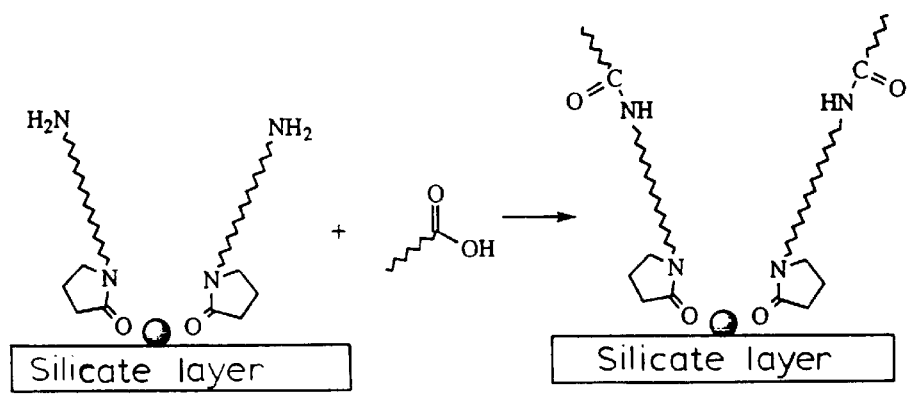
FIG. 6
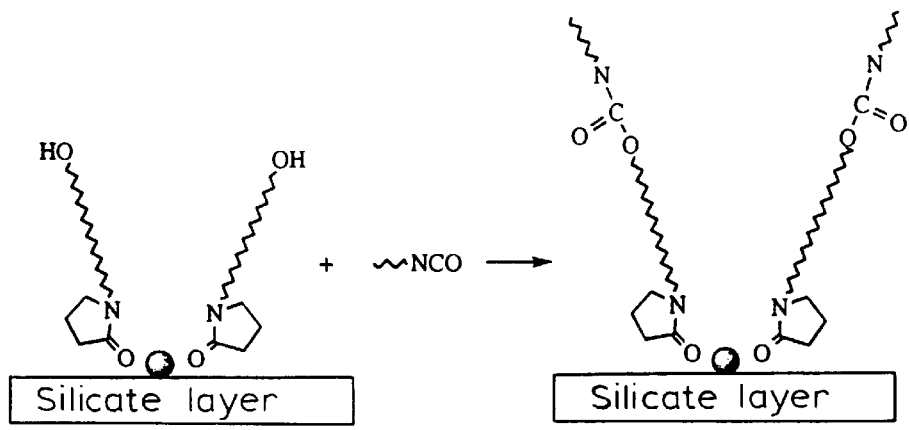
FIG. 7

INTERCALATES AND EXFOLIATES FORMED WITH LONG CHAIN (C6+) OR AROMATIC MATRIX POLYMER-COMPATIBLE MONOMERIC, OLIGOMERIC OR POLYMERIC INTERCALANT COMPOUNDS AND COMPOSITE MATERIALS CONTAINING SAME

CROSS-REFERENCE TO RELATED APPLICATION

This application is a continuation-in-part of U.S. application Ser. No. 08/907,950 filed Aug. 11, 1997 which is a continuation-in-part of U.S. application Ser. No. 08/758,740 filed Dec. 6, 1996.

FIELD OF THE INVENTION

The present invention is directed to intercalated layered materials, and exfoliates thereof, manufactured by sorption (adsorption and/or absorption) of one or more intercalant compounds selected from (a) long chain ($C_6$+) monomeric, oligomeric or polymeric intercalant compounds; or (b) aromatic ring-containing monomeric, oligomeric or polymeric intercalant compounds. The intercalant compounds are intercalated between planar layers of a swellable layered material, such as a phyllosilicate, to expand the interlayer spacing of adjacent layers at least about 5 Angstroms (Å), preferably at least about 10 Å. More particularly, the present invention is directed to intercalates formed with an intercalant compound selected from monomeric, oligomeric or polymeric intercalant molecules that are (a) long chain ($C_6$+ alkyl) compounds; or (b) aromatic ring-containing compounds, the intercalant compounds (a) and (b) including a matrix polymer-compatible functionality that is reactive with the matrix polymer melt extending from the intercalant molecule or at a free end (the end not complexed to cations of the interlayer surfaces of the layered material platelets). In accordance with one embodiment, the extending matrix polymer-reactive moiety may be covalently bound on both sides of the functionality, e.g., a reactive alkene or alkyne group that is reactive with the matrix polymer. The intercalant molecules are sorbed on the internal surfaces between adjacent layers of the planar platelets of a layered material, such as a phyllosilicate, preferably a smectite clay. One end of the intercalant molecules that coordinates or complexes to surrounding $Na^+$ ions on the inner surface of the phyllosilicate platelets connect to the platelet surfaces through an electrostatic attraction, e.g., dipole-dipole complexing, to form rigid columns of the intercalant molecules that extend upwardly, away from the platelet surfaces to provide surprisingly large basal spacings between adjacent phyllosilicate platelets with relatively few intercalant molecules. The other (free) end of the intercalant molecules include (a) $C_6$+ alkyl moiety or (b) an aromatic ring, both the (a) and (b) intercalant molecules having a free functional group covalently bonded to the molecule, such as a functionality selected from the group consisting of an amine; a carboxylic acid or its metal salt; a polycarboxylic acid or salt thereof; a hydroxyl; a polyhydroxyl; a carbonyl; an amide; an ether; an ester; a lactam; an aldehyde; a ketone; a lactone; an anhydride; a nitrile; an n-alkyl halide; a pyridine; a pyrrolidone; a free carbon to carbon double bond or triple bond

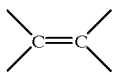

or —C=C—; and mixtures thereof for better compatibility and reactivity with a matrix material, such as a matrix polymer or organic solvent that the intercalates, or exfoliates thereof are intermixed with for enhanced properties of the matrix material.

Some of such intercalant compounds are commercially available, and others can be synthesized. The adjacent, relatively widely spaced platelets of such intercalates, and the exfoliates thereof, therefore, have a very porous gallery of functionalized long chain ($C_6$+ alkyl) and/or functionalized aromatic ring-containing molecules extending away from the inner surface of the clay platelets, resulting in increased sorption (absorption and/or adsorption) of both hydrophilic and hydrophobic molecules by the resulting intercalates and exfoliates thereof; excellent intercalates and exfoliates for combining with melt polymers (matrix thermoplastic and/or thermosetting polymers) for increased mechanical strength; increased oxygen impermeability in films and sheets; increased temperature resistance characteristics; and the like. The long chain ($C_6$+ alkyl) and/or aromatic functionalized intercalant molecules expand the interlayer spacing of the phyllosilicate at least about 5 Å, preferably at least about 10 Å, more preferably to at least about 20 Å, and most preferably to at least about 30–45 Å, up to about 100 Å, or disappearance of periodicity.

The intercalated long chain ($C_6$+) and/or aromatic ring-containing intercalant monomers, oligomers, and polymers surprisingly form a unique type of intercalate and exfoliate that includes rigid extending columns of long chain ($C_6$+ alkyl) and/or aromatic ring-containing intercalant molecules that have the long chain ($C_6$+ alkyl) and/or aromatic ring portion of the intercalant molecules covalently bonded to a free matrix polymer-compatible and reactive functionality extending from the intercalant molecule or at a free end of the intercalant that extends upwardly from one platelet surface. The same or different intercalant molecules extending upwardly from an adjacent platelet surface abutt the opposed, extending intercalant molecules at the matrix polymer-compatible functionalities, to hold the adjacent platelets more widely spaced, with fewer intercalant molecules than any intercalate heretofore known.

The resulting intercalates are neither entirely organophilic nor entirely hydrophilic, but a combination of the two; have surprising sorption of hydrophilic and hydrophobic molecules; have surprising compatibility, and reactivity, with combined matrix materials, such as polymers or organic solvents; and easily can be exfoliated and combined as individual platelets with a matrix polymer to form a composite material; or combined with a polar organic solvent carrier matrix material to form a viscous composition having a myriad of uses. The resulting intercalate or exfoliate; or polymer/intercalate or polymer/exfoliated platelet composite materials are useful as plasticizers; for providing increased viscosity and elasticity to thermoplastic and thermosetting polymers, e.g., for plasticizing polyvinyl chloride; for food wrap having improved gas impermeability; for electrical components; for food grade drink containers; for raising the viscosity of polar organic liquids; flame retardation; and for altering one or more physical properties of a matrix polymer, such as elasticity and temperature characteristics, e.g., glass transition temperature and high temperature resistance.

BACKGROUND OF THE INVENTION AND PRIOR ART

It is well known that phyllosilicates, such as smectite clays, e.g., sodium montmorillonite and calcium montmorillonite, can be treated with organic molecules, such as organic ammonium ions, to intercalate the organic molecules between adjacent, planar silicate layers, for bonding the organic molecules with a polymer, for intercalation of the polymer between the layers, thereby substantially increasing the interlayer (interlaminar) spacing between the adjacent silicate layers. The thus-treated, intercalated phyllosilicates, having interlayer spacings of at least about 10–20 Å and up to about 100 Angstroms, then can be exfoliated, e.g., the silicate layers are separated, e.g., mechanically, by high shear mixing. The individual silicate layers, when admixed with a matrix polymer, before, after or during the polymerization of the matrix polymer, e.g., a polyamide—see U.S. Pat. Nos. 4,739,007; 4,810,734; and 5,385,776—have been found to substantially improve one or more properties of the polymer, such as mechanical strength and/or high temperature characteristics.

Exemplary prior art composites, also called "nanocomposites", are disclosed in published PCT disclosure of Allied Signal, Inc. WO 93/04118 and U.S. Pat. No. 5,385,776, disclosing the admixture of individual platelet particles derived from intercalated layered silicate materials, with a polymer to form a polymer matrix having one or more properties of the matrix polymer improved by the addition of the exfoliated intercalate. As disclosed in WO 93/04118, the intercalate is formed (the interlayer spacing between adjacent silicate platelets is increased) by adsorption of a silane coupling agent or an onium cation, such as a quaternary ammonium compound, having a reactive group which is compatible with the matrix polymer. Such quaternary ammonium cations are well known to convert a highly hydrophilic clay, such as sodium or calcium montmorillonite, into an organophilic clay capable of sorbing organic molecules. A publication that discloses direct intercalation (without solvent) of polystyrene and poly (ethylene oxide) in organically modified silicates is *Synthesis and Properties of Two-Dimensional Nanostructures by Direct Intercalation of Polymer Melts in Layered Silicates,* Richard A. Vaia, et al., Chem. Mater., 5:1694–1696(1993). Also as disclosed in *Adv. Materials,* 7, No. 2: (1985), pp, 154–156, *New Polymer Electrolyte Nanocomposites: Melt Intercalation of Poly(Ethylene Oxide) in Mica-Type Silicates,* Richard A. Vaia, et al., poly(ethylene oxide) can be intercalated directly into Na-montmorillonite and Li-montmorillonite by heating to 80° C. for 2–6 hours to achieve a d-spacing of 17.7 Å. The intercalation is accompanied by displacing water molecules, disposed between the clay platelets, with polymer molecules. Apparently, however, the intercalated material could not be exfoliated and was tested in pellet form. It was quite surprising to one of the authors of these articles that exfoliated material could be manufactured in accordance with the present invention.

Previous attempts have been made to intercalate polyvinylpyrrolidone (PVP), polyvinyl alcohol (PVA) and poly (ethylene oxide) (PEO) between montmorillonite clay platelets with little success. As described in Levy, et al., *Interlayer Adsorption of Polyvinylpyrrolidone on Montmorillonite,* Journal of Colloid and Interface Science, Vol. 50, No. 3, March 1975, pages 442–450, attempts were made to sorb PVP (40,000 average M.W.) between monoionic montmorillonite clay platelets (Na, K, Ca and Mg) by successive washes with absolute ethanol, and then attempting to sorb the PVP by contact with 1% PVP/ethanol/water solutions, with varying amounts of water, via replacing the ethanol solvent molecules that were sorbed in washing (to expand the platelets to about 17.7 Å). Only the sodium montmorillonite had expanded beyond a 20 Å basal spacing (e.g., 26 Å and 32 Å), at 5+% $H_2O$, after contact with the PVP/ethanol/$H_2O$ solution. It was concluded that the ethanol was needed to initially increase the basal spacing for later sorption of PVP, and that water did not directly affect the sorption of PVP between the clay platelets (Table II, page 445), except for sodium montmorillonite. The sorption was time consuming and difficult and met with little success.

Further, as described in Greenland, *Adsorption of Polyvinyl Alcohols by Montmorillonite,* Journal of Colloid Sciences, Vol. 18, pages 647–664 (1963), polyvinyl alcohols containing 12% residual acetyl groups could increase the basal spacing by only about 10 Å due to the sorbed polyvinyl alcohol (PVA). As the concentration of polymer in the intercalant polymer-containing solution was increased from 0.25% to 4%, the amount of polymer sorbed was substantially reduced, indicating that sorption might only be effective at polymer concentrations in the intercalant polymer-containing composition on the order of 1% by weight polymer, or less. Such a dilute process for intercalation of polymer into layered materials would be exceptionally costly in drying the intercalated layered materials for separation of intercalate from the polymer carrier, e.g., water, and, therefore, apparently no further work was accomplished toward commercialization.

In accordance with one embodiment of the present invention, intercalates are prepared by contacting a phyllosilicate with a monomeric, oligomeric or polymeric organic intercalant compound selected from (a) a compound having a long chain alkyl radical ($C_6+$ alkyl) or (b) an aromatic ring-containing compound, both (a) and (b) intercalant compounds having a free matrix polymer-compatible, reactive functionality covalently bonded to the $C_6+$ alkyl or aromatic ring. The matrix polymer-compatible functionality is a moiety, for example, selected from the group consisting of an amine; a carboxylic acid or a carboxylic acid metal salt; a polycarboxylic acid or salt thereof; a hydroxyl; a polyhydroxyl; a carbonyl; an amide; an ether; an ester; a lactam; an aldehyde; a ketone; a lactone; an anhydride; a nitrile; an n-alkyl halide; a pyridine; a pyrrolidone; a free carbon to carbon double bond or triple bond

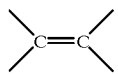

or —C≡C—; and mixtures thereof. The intercalant compound has an electrostatic functionality on the other end of the molecule that provides for complexing to cations, e.g., $Na^+$ cations, on the inner surfaces of the layered material platelets. Exemplary of such electrostatic functionalities include a hydroxyl; a polyhydroxyl; a carbonyl, such as carboxylic acids, and salts thereof; a polycarboxylic acid and salts thereof; an aldehyde; a ketone; an amine; an amide; an ether; an ester; a lactam; a lactone; an anhydride; a nitrile; a n-alkyl halide; a pyridine; a pyrrolidone; and mixtures thereof.

In accordance with an important feature of the present invention, best results are achieved by mixing the layered material with a polar monomeric, oligomeric or polymeric organic intercalant compound, having a $C_6+$ alkyl group and/or an aromatic ring. The intercalant compounds include a matrix polymer-compatible end group covalently bonded to one end of the $C_6+$ alkyl group or aromatic ring. The matrix polymer-compatible intercalant includes a $C_6+$ alkyl group and/or aromatic ring having a free functional group covalently bonded to the molecule, such as a functionality selected from the group consisting of an amine, a carboxylic acid, a metal salt of a carboxylic acid, a hydroxyl; a polyhydroxyl; a carbonyl; an amide; an ether; an ester; a lactam; a polycarboxylic acid or salt thereof; an aldehyde; a ketone; a lactone; an anhydride; a nitrile; an n-alkyl halide; a pyridine; a pyrrolidone; an unsaturated carbon to carbon bond, such as

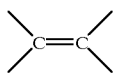

or —C≡C—; and mixtures thereof. The intercalant compound also has an electrostatic complexing functionality on the other end of the intercalant molecule that electrostatically complexes with interlayer cations on the interlayer platelet surfaces.

The intercalant compound is intercalated into the layered material by contacting the layered material with an intercalating composition containing the intercalant compound in a concentration of at least about 2%, preferably at least about 5% by weight long chain alkyl and/or aromatic ring-containing intercalant compound, more preferably at least about 10% by weight long chain alkyl or aromatic ring-containing intercalant compound, and most preferably about 30% to about 80% by weight, based on the weight of long chain ($C_6+$) alkyl or aromatic ring-containing intercalant compound and carrier (e.g., water, with or without an organic solvent for the long chain alkyl or aromatic ring-containing intercalant compound) to achieve better sorption of the organic intercalant compound between the platelets of the layered material. Regardless of the concentration of intercalant compound in the intercalant carrier, the intercalating composition should have a long chain and/or aromatic ring-containing intercalant compound:layered material weight ratio of at least 1:20, preferably at least 1:10, more preferably at least 1:5, to achieve efficient electrostatic completing of one end of the intercalant compound with an inner surface of a platelet of the layered material. The long chain ($C_6+$ alkyl) and/or aromatic ring-containing intercalant compound sorbed between and complexed with the silicate platelets causes surprising separation or added spacing between adjacent silicate platelets.

For simplicity of description, the above-described (a) $C_6+$ alkyl monomeric, oligomeric, or polymeric intercalant compounds and (b) aromatic ring-containing monomeric, oligomeric, or polymeric intercalant compounds, wherein both (a) and (b) intercalant compounds have at least one phyllosilicate platelet-complexing molecule end that has an electrostatic attraction for, and complexes with, interlayer cations of the layered material, and another free functionality, somewhere along the molecule or at the molecule end, that has a matrix polymer-compatible and polymer-reactive functional group, are hereinafter called the "intercalant" or "surface modifier" or "intercalant surface modifier". The intercalant will be sorbed sufficiently to increase the interlayer spacing of the phyllosilicate in the range of about 5 Å to about 100 Å, preferably at least about 10 Å for easier and more complete exfoliation, in a commercially viable process, regardless of the particular layered material, e.g., phyllosilicate, or intercalant.

In accordance with the present invention, it has been found that a phyllosilicate, such as a smectite clay, can be intercalated sufficiently for subsequent exfoliation by sorption of the above-described intercalant compounds (having an alkyl group of at least 6 carbon atoms or an aromatic ring; an electrostatic functionality on one end of the molecule to provide bonding (complexing) between the electrostatic functionality of one or two intercalant molecules and the $Na^+$ or other cations of the inner surfaces of the platelets of the layered material, e.g., phyllosilicate; and a matrix polymer-compatible and reactive functionality extending from the intercalant molecule or on a free end thereof, without prior sorption of an onium ion or silane coupling agent. Sorption and metal cation attraction or bonding between two electrostatic end groups of the intercalant molecules and the interlayer cations of the phyllosilicate; or the bonding between the interlayer cations in hexagonal or pseudohexagonal rings of the smectite platelet layers and an intercalant aromatic ring structure, is provided by a mechanism selected from the group consisting of ionic complexing; electrostatic complexing; chelation; hydrogen bonding; ion-dipole; dipole/dipole; Van Der Waals forces; and any combination thereof.

Such bonding, via one or more metal cations, e.g., $Na^+$, of the phyllosilicate sharing electrons with one or two electronegative atoms of one or two electrostatic ends of $C_6+$ alkyl or aromatic ring-containing intercalant molecules, on inner surfaces of one or both adjacent phyllosilicate platelets surprisingly provides rigid intercalant molecules extending upwardly from the phyllosilicate platelet surfaces, and increases the interlayer spacing between adjacent silicate platelets or other layered material at least about 5 Å, preferably at least about 10 Å, more preferably to at least about 20 Å, and most preferably in the range of about 30 Å to about 45 Å, while consuming surprisingly few intercalant molecules in relation to the increased basal spacing achieved. The electronegative atoms at a polar end of the intercalant molecules that coordinate to surround the platelet $Na^+$ ions can be, for example, oxygen, sulfur, nitrogen, halogen, and combinations thereof.

Such intercalated phyllosilicates easily can be exfoliated into individual phyllosilicate platelets before or during admixture with a liquid carrier or solvent, for example, one or more monohydric alcohols, such as methanol, ethanol, propanol, and/or butanol; polyhydric alcohols, such as glycerols and glycols, e.g., ethylene glycol, propylene glycol, butylene glycol, glycerine and mixtures thereof; aldehydes; ketones; carboxylic acids; amines; amides; and other organic solvents, for delivery of the solvent in a thixotropic composition, or for delivery of any active hydrophobic or hydrophilic organic compound, such as a topically active pharmaceutical, dissolved or dispersed in the carrier or solvent, in a thixotropic composition; or the intercalates and/or exfoliates thereof can be admixed with a polymer or organic monomer compound(s) or composition to increase the viscosity of the organic compound or provide a polymer/intercalate and/or polymer/exfoliate composition to enhance one or more properties of a matrix polymer.

DEFINITIONS

Whenever used in this Specification, the terms set forth shall have the following meanings:

"Layered Material" shall mean an inorganic material, such as a smectite clay mineral, that is in the form of a plurality of adjacent, bound layers and has a thickness, for each layer, of about 3 Å to about 50 Å, preferably about 10 Å.

"Platelets" shall mean individual layers of the Layered Material.

"Intercalate" or "Intercalated" shall mean a Layered Material that includes long chain alkyl ($C_6+$ alkyl) organic molecules disposed between adjacent platelets of the Layered Material to increase the interlayer spacing between the adjacent platelets at least about 5 Å, preferably at least about 10 Å.

"Intercalation" shall mean a process for forming an Intercalate. "Intercalant" shall mean a monomeric, oligomeric and/or polymeric compound that includes a matrix polymer-compatible functionalized (a) long chain alkyl ($C_6+$ alkyl) group, or (b) aromatic ring along the intercalant molecule or at a free end thereof, and includes, at a layered material-complexed opposite end of the molecule, a polar moiety or electrostatic functionality that provides the molecule with a dipole moment sufficient to provide electrostatic complexing between the polar moiety or electrostatic functionality and the cations on an interlayer surface of the layered material platelets. Suitable polar moieties include, for example, a moiety selected from the group consisting of: a hydroxyl; a polyhydroxyl; a carbonyl; a carboxylic acid; an amine; an amide; an ether; an ester; a lactam; a polycarboxylic acid or salt thereof; an aldehyde; a ketone; a lactone; an anhydride; a nitrile; an n-alkyl halide; a pyridine; a pyrrolidone; polymers and oligomers containing same; and mixtures thereof for complexing with the cations on the platelet surfaces to form an Intercalate.

"Intercalating Carrier" shall mean a carrier comprising water with or without an organic solvent used together with an Intercalant to form an Intercalating Composition capable of achieving Intercalation of the Layered Material.

"Intercalating Composition" or "Intercalant Composition" shall mean a composition comprising an Intercalant, an Intercalating Carrier for the Intercalant, and a Layered Material.

"Electrostatic Functionality" shall mean a functional group on one end of the $C_6+$ alkyl-containing and/or aromatic ring-containing Intercalant that is sufficiently polar to electrostatically complex with interlayer cations on the interlayer platelet surfaces of the Layered Material, examples of which are set forth above in the "Intercalant" definition.

"Matrix Polymer-Compatible Functionality" shall mean, a functionality or moiety covalently bonded to the $C_6+$ alkyl and/or aromatic ring of the intercalant that covalently bonds to or cross-links a matrix polymer when the intercalant and/or exfoliate thereof is mixed with a melt of the matrix polymer to form a nanocomposite, for example, an amine, a carboxylic acid or a metal salt of a carboxylic acid; a polycarboxylic acid or salt thereof; a hydroxyl; a polyhydroxyl; a carbonyl; an amide; an ether; an ester; a lactam; an aldehyde; a ketone; a lactone; an anhydride; a nitrile; an n-alkyl halide; a pyridine; a pyrrolidone; a free carbon to carbon double bond or triple bond

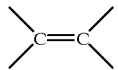

or —C═C—; and mixtures thereof.

"Exfoliate" or "Exfoliated" shall mean individual platelets of an Intercalated Layered Material so that adjacent platelets of the Intercalated Layered Material can be dispersed individually throughout a carrier material, such as water, a polymer, an alcohol or glycol, or any other organic liquid.

"Exfoliation" shall mean a process for forming an Exfoliate from an Intercalate.

"Nanocomposite" shall mean a mixture that includes a monomer, oligomer, polymer, or copolymer having dispersed therein an intercalate or, preferably, a plurality of individual platelets obtained by exfoliating the Intercalated Layered Material.

"Matrix Monomer" shall mean a monomer that the Intercalate or Exfoliate is mixed with or dispersed in.

"Matrix Polymer" shall mean a thermoplastic or thermosetting oligomer or polymer in which the Intercalate and/or Exfoliate is mixed or dispersed to form a Nanocomposite.

SUMMARY OF THE INVENTION

In brief, the present invention is directed to intercalates and exfoliates thereof formed by contacting a layered phyllosilicate with (a) a long chain alkyl intercalant, having an alkyl group of at least 6 carbon atoms, and/or (b) an aromatic ring-containing intercalant, both (a) and (b) having an electrostatic functionality at a layered material-complexed end of the molecule that is sufficient to provide electrostatic complexing of the intercalant to the interlayer cations on the platelet surface of the layered material, and a matrix polymer-compatible functionality extending from the intercalant molecule or at a free end thereof of the intercalant. Suitable long chain and aromatic ring-containing intercalants include a polar (electrostatic) end having at least one moiety selected from the group consisting of a hydroxyl functionality; a carbonyl functionality; a carboxylic acid or carboxylic acid salt functionality; an amine functionality; an amide functionality; an ether functionality; an ester functionality; a lactam functionality; a lactone functionality; an anhydride functionality; a nitrile functionality; an n-alkyl halide functionality; a pyridine functionality; a pyrrolidone functionality; a carbon to carbon unsaturated bond (

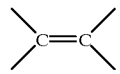

or —C═C—); and mixtures thereof to sorb or intercalate the intercalant or mixtures of intercalants between adjacent platelets of a layered inorganic material, e.g., a phyllosilicate.

Another portion of the intercalant includes a $C_6+$ alkyl group or aromatic ring having a polymer-compatible and polymer melt-reactive functionality or moiety covalently bonded to the $C_6+$ alkyl and/or aromatic ring of the intercalant that covalently bonds (reacts) with the matrix polymer, said functionality capable of covalently bonding to a matrix material, e.g., a polymer or organic liquid, when the intercalant and/or exfoliate thereof is mixed with the matrix material to form a nanocomposite. Examples of suitable matrix material-compatible and reactive functional groups include an amine, a carboxylic acid or a metal salt of a carboxylic acid; a polycarboxylic acid and/or a salt thereof; a hydroxyl; a polyhydroxyl; a carbonyl; an amide; an ether; an ester; a lactam; an aldehyde; a ketone; a lactone; an anhydride; a nitrile; an n-alkyl halide; a pyridine; a pyrrolidone; a carbon to carbon unsaturated bond (i.e., alkene or alkyne); and mixtures thereof.

Sufficient intercalant is sorbed between adjacent phyllosilicate platelets to expand the spacing between adjacent platelets (interlayer spacing) a distance of at least about 5 Å, preferably at least about 10 Å (as measured after water removal to a maximum water content of 5% by weight, based on the dry weight of the layered material) and more preferably to an interlayer spacing in the range of about 30–45 Å, so that the intercalate easily can be exfoliated, sometimes naturally without shearing being necessary. At times, the intercalate requires shearing that easily can be accomplished, e.g., when mixing the intercalate with a polar organic solvent carrier, such as a polar organic hydrocarbon, and/or with a polymer melt to provide a platelet-containing composite material or nanocomposite—the platelets being obtained by exfoliation of the intercalated layered-material, e.g., phyllosilicate.

The intercalant electrostatic functionality has an affinity for the cations on the inner surfaces of the phyllosilicate platelets so that it is sorbed between, and is maintained associated with the silicate platelets in the interlayer spaces, and is complexed to the platelet surfaces after exfoliation. In accordance with the present invention, it is hereby theorized that the intercalant is electrostatically complexed to the interlayer cations by a mechanism selected from the group consisting of ionic complexing; electrostatic complexing; chelation; hydrogen bonding; ion-dipole; dipole/dipole; Van Der Waals forces; and any combination thereof. Such bonding, via a metal cation, e.g., $Na^+$, of the phyllosilicate inner platelet surface sharing electrons with electronegative atoms of a polar end of the long chain, or aromatic ring-containing intercalant compound, provides adherence between the intercalant molecules and the platelet inner surfaces of the layered material. The electronegative atoms on the electrostatic, polar end of the intercalant can be, for example, oxygen, sulfur, nitrogen, halogen, and combinations thereof. Atoms having a sufficient electronegativity to bond to metal cations on the inner surface of the platelets have an electronegativity of at least 2.0, and preferably at least 2.5, on the Pauling Scale. A "polar moiety" or "polar group" is defined as a moiety having two adjacent atoms that are bonded covalently and have a difference in electronegativity of at least 0.5 electronegativity units on the Pauling Scale.

Such intercalants have sufficient affinity for the exchangeable cations of the phyllosilicate platelets to maintain sufficient interlayer spacing for exfoliation, without the need for coupling agents or spacing agents, such as the onium ion or silane coupling agents disclosed in the above-mentioned prior art. Consequently, in accordance with the present invention, the phyllosilicate inner platelet surfaces need not be first reacted with an onium ion or silane coupling agent in order to complex the intercalant to the inner platelet surfaces. A schematic representation of the charge distribution on the surfaces of a sodium montmorillonite clay is shown in FIGS. 1–3. As shown in FIGS. 2 and 3, the location of surface cations, i.e., $Na^+$, $Mg^{+2}$ and $Al^{+3}$ with respect to the location of oxygen (Ox) and Si atoms (FIGS. 1 and 2) results in a clay surface charge distribution as schematically shown in FIG. 3. The positive-negative charge distribution over the entire clay surface provides for excellent dipole/dipole attraction of the above-described long chain, or aromatic ring-containing intercalants on the surfaces of the clay platelets.

The intercalate-containing and/or exfoliate-containing compositions can be in the form of a stable thixotropic gel that is not subject to phase separation and can be used to deliver any active materials, such as in the cosmetic, hair care and pharmaceutical industries. The layered material is intercalated and optionally exfoliated by contact with an intercalant and water, such as by mixing and/or extruding the intercalant composition to intercalate the intercalant between adjacent phyllosilicate platelets and optionally separate (exfoliate) the layered material into individual platelets. The amount of water varies, depending upon the amount of shear imparted to the layered material in contact with the intercalant and water. In one method, the intercalating composition is pug milled or extruded at a water content of about 25% by weight to about 50% by weight water, preferably about 35% to about 40% by weight water, based on the dry weight of the layered material, e.g., clay. In another method, the clay and water are slurried, with at least about 25% by weight water, preferably at least about 65% by weight water, based on the dry weight of the layered material, e.g., preferably less than about 20% by weight clay in water, based on the total weight of layered material and water, more preferably less than about 10% layered material in water, with the addition of about 2% by weight to about 90% by weight intercalant, based on the dry weight of the layered material.

Sorption of the intercalant should be sufficient to achieve expansion of the interlayer spacing of adjacent platelets of the layered material (when measured dry) at least about 5 Å, preferably at least about 10 Å, more preferably to achieve a spacing of at least about 20 Å, and most preferably a spacing of about 30–45 Å. To achieve intercalates that can be exfoliated easily using the intercalants disclosed herein, the weight ratio of intercalant to layered material, preferably a water-swellable smectite clay, such as sodium bentonite, in the intercalating composition should be at least about 1:20, preferably at least about 1:12 to 1:10, more preferably at least about 1:5. It is preferred that the concentration of intercalant in the intercalating composition, based on the total weight of intercalant plus intercalant carrier (water plus any organic liquid solvent) in the intercalating composition is at least about 15% by weight, more preferably at least about 20% by weight intercalant, for example about 20–30% to about 90% by weight intercalant, based on the weight of intercalant plus intercalating carrier in the intercalating composition during intercalation of the layered material.

Surprising results are achieved when the molar ratio of intercalant to phyllosilicate interlayer cations is at least 2:1, particularly at 3:1 or greater. Basal spacings that result from such molar ratios are far greater than have ever been achieved using the same ratios of other intercalants.

Interlayer spacings sufficient for exfoliation are achieved by direct intercalation of the above-defined intercalants, preferably without prior sorption of an onium or silane coupling agent, and provide easier and more complete exfoliation for or during incorporation of the platelets into a polar organic compound or a polar organic compound-containing composition carrier or solvent to provide unexpectedly viscous carrier compositions, for delivery of the carrier or solvent, or for administration of an active compound that is dissolved or dispersed in the carrier or solvent. Such compositions, especially the high viscosity gels, are particularly useful for delivery of active compounds, such as oxidizing agents for hair waving lotions, and drugs for topical administration, since extremely high viscosities are obtainable; and for admixtures of the platelets with polar solvents in modifying rheology, e.g., of cosmetics, oil-well drilling fluids, paints, lubricants, especially food grade lubricants, in the manufacture of oil and grease, and the like. Such intercalates and/or exfoliates also are especially useful in admixture with matrix thermoplastic or thermosetting polymer melts in the manufacture of polymeric articles from the polar organic carrier/polymer/intercalate and/or platelet composite materials.

Once exfoliated, the platelets of the intercalate are predominantly completely separated into individual platelets and the originally adjacent platelets no longer are retained in a parallel, spaced disposition, but are free to move as predominantly individual intercalant-coated (continuously or discontinuously) platelets throughout a polymer melt for enhancing one or more properties, such as strength or temperature resistance; or for mixing with a carrier or solvent material to maintain viscosity and thixotropy of the carrier material. The predominantly individual phyllosilicate platelets, having their platelet surfaces complexed with intercalant molecules, are randomly, homogeneously and uniformly dispersed, predominantly as individual platelets, throughout the carrier or solvent to achieve new and unexpected viscosities in the carrier/platelet compositions even after addition of an active organic compound, such as a cosmetic component or a medicament, for administration of the active organic compound(s) from the composition.

As recognized, the thickness of the exfoliated, individual platelets (about 10 Å) is relatively small compared to the size of the flat opposite platelet faces. The platelets have an aspect ratio in the range of about 200 to about 2,000. Dispersing such finely divided platelet particles into a polymer melt or into a polar organic liquid carrier imparts a very large area of contact between polymer melt or carrier and platelet particles, for a given volume of particles in the composite, and a high degree of platelet homogeneity in the composite material. Platelet particles of high strength and modulus, dispersed at sub-micron size (nanoscale), impart greater mechanical reinforcement to a polymer and a higher viscosity to a polar organic liquid carrier than do comparable loadings of conventional reinforcing fillers of micron size, and can impart lower permeability to matrix polymers than do comparable loadings of conventional fillers.

BRIEF DESCRIPTION OF THE DRAWINGS

FIG. 1 is a schematic representation of a top view of sodium montmorillonite clay showing the ionic charge distribution for the sodium montmorillonite clay top and interlayer surfaces showing $Na^+$ ions as the largest circles as well as magnesium and aluminum ions and Si and oxygen (Ox) atoms disposed beneath the sodium ions;

FIGS. 5–7 are schematic diagrams of various intercalants, having varied matrix polymer-compatible and reactive functionalities, covalently bonding with an epoxy (FIG. 5); a carboxylic acid (FIG. 6) and an NCO (FIG. 7) matrix polymer-compatible and reactive functionalities of the intercalant to achieve covalent bonds between the matrix polymer-compatible functionalities of the intercalant and the matrix polymer;

DETAILED DESCRIPTION OF THE PREFERRED EMBODIMENTS

Figure 2:
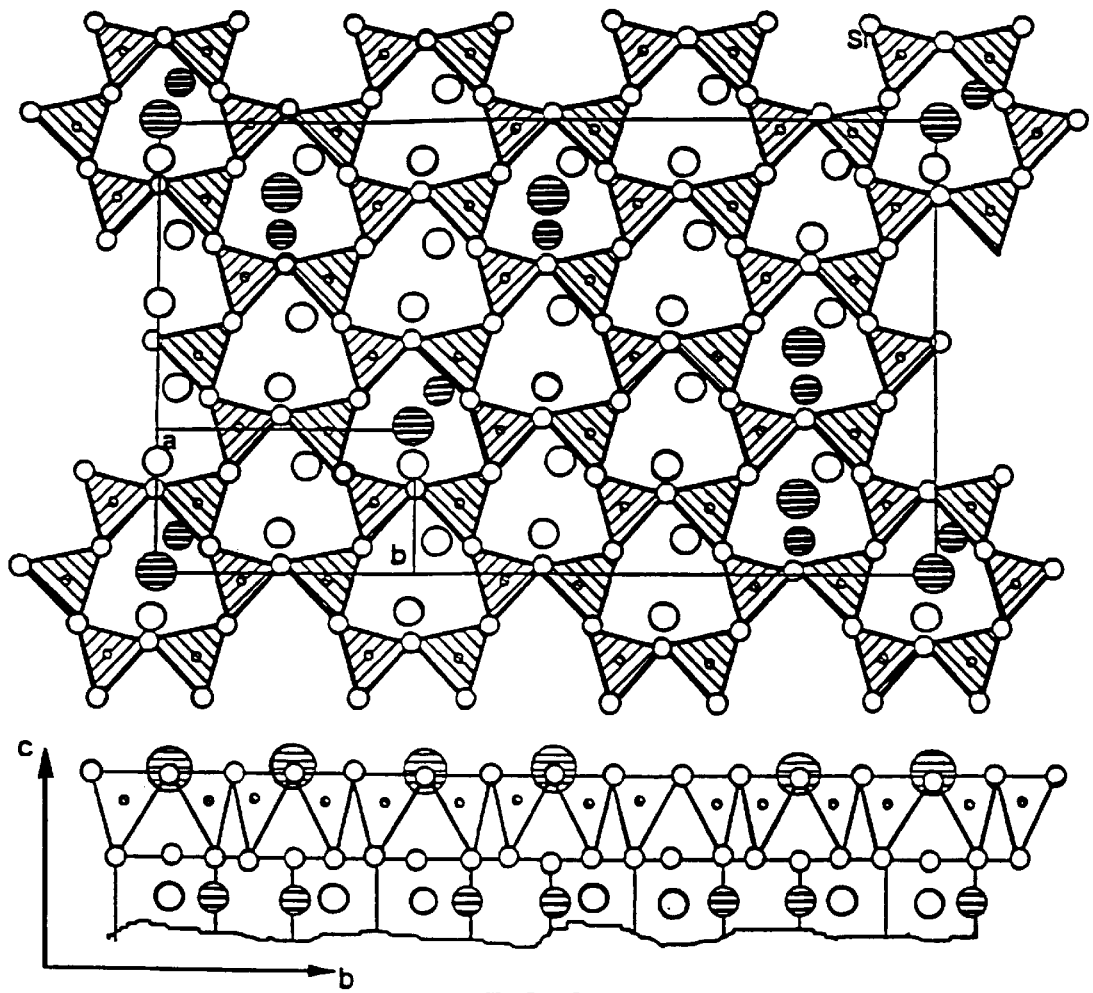
FIG. 2 is a side view (bc-projection) of the schematic representation of FIG. 1.

To form the intercalated and exfoliated materials of the present invention, the layered material, e.g., the phyllosilicate, should be swelled or intercalated by sorption of an intercalant monomer, oligomer and/or polymer that includes (a) an alkyl group having at least 6 carbon atoms and/or (b) an aromatic ring. Intercalants (a) and (b) include a matrix material-compatible, e.g., matrix polymer-compatible, functional group, extending from the intercalant molecule or on a free end thereof, that is covalently bonded to the $C_6+$ alkyl or aromatic ring, and each intercalant (a) and (b) includes a second molecule end (complexing end) capable of electrostatic complexing with interlayer cations of the layered material.

In accordance with a preferred embodiment of the present invention, the phyllosilicate should include at least 4% by weight water, up to about 5,000% by weight water, based on the dry weight of the phyllosilicate, preferably about 7% to about 100% water, more preferably about 25% to about 50% by weight water, prior to or during contact with the intercalant to achieve sufficient intercalation for exfoliation. Preferably, the phyllosilicate should include at least about 4% by weight water before contact with the intercalating carrier for efficient intercalation. The amount of intercalant in contact with the phyllosilicate from the intercalating composition, for efficient exfoliation, should provide an intercalant/phyllosilicate weight ratio (based on the dry weight of the phyllosilicate) of at least about 1:20, preferably at least about 3.2/20, and more preferably about 4–14/20, to provide efficient sorption and complexing (intercalation) of the intercalant between the platelets of the layered material, e.g., phyllosilicate.

The intercalants are introduced in the form of a solid or liquid composition (neat or aqueous, with or without an organic solvent, e.g., an aliphatic hydrocarbon, such as heptane) having an intercalant concentration of at least about 2%, preferably at least about 50% by weight intercalant, more preferably at least about 50% to about 100% by weight intercalant in the intercalating composition, based on the dry weight of the layered material, for intercalant sorption. The intercalant can be added as a solid with the addition to the layered material/intercalant blend of about 20% water, preferably at least about 30% water to about 5,000% water or more, based on the dry weight of layered material. Preferably about 30% to about 50% water, more preferably about 30% to about 40% water, based on the dry weight of the layered material, is included in the intercalating composition when extruding or pug milling, so that less water is sorbed by the intercalate, thereby necessitating less drying energy after intercalation. The intercalants may be introduced into the spaces between every layer, nearly every layer, or at least a predominance (more than 50%) of the layers of the layered material such that the subsequently exfoliated platelet particles are, preferably, predominantly less than about 5 layers in thickness; more preferably, predominantly about 1 or 2 layers in thickness; and most preferably, predominantly (more than 50%) single platelets, with the remainder, if any, being tactoids of 2 or more platelets.

Any swellable layered material that sufficiently sorbs the intercalant to increase the interlayer spacing between adjacent phyllosilicate platelets at least about 5 Å, preferably at least about 10 Å (when the phyllosilicate is measured dry) may be used in the practice of this invention. Useful swellable layered materials include phyllosilicates, such as smectite clay minerals, e.g., montmorillonite, particularly sodium montmorillonite; magnesium montmorillonite and/or calcium montmorillonite; nontronite; beidellite; volkonskoite; hectorite; saponite; sauconite; sobbckite; stevensite; svinfordite; vermiculite; and the like. Other useful layered materials include micaceous minerals, such as illite and mixed layered illite/smectite minerals, such as rectorite, tarosovite, ledikite and admixtures of illites with the clay minerals named above.

Other layered materials having little or no charge on the layers may be useful in this invention provided they can be intercalated with the intercalants to expand their interlayer spacing at least about 5 Å, preferably at least about 10 Å. Preferred swellable layered materials are phyllosilicates of the 2:1 type having a negative charge on the layers ranging from about 0.15 to about 0.9 charges per formula unit and a commensurate number of exchangeable metal cations in the interlayer spaces. Most preferred layered materials are smectite clay minerals such as montmorillonite, nontronite, beidellite, volkonskoite, hectorite, saponite, sauconite, sobockite, stevensite, and svinfordite.

As used herein the "interlayer spacing" refers to the distance between the internal faces of the adjacent layers as they are assembled in the layered material before any delamination (exfoliation) takes place. The interlayer spacing is measured when the layered material is "air dry", e.g., contains about 3–6% by weight water, e.g., 5% by weight water based on the dry weight of the layered material. The preferred clay materials generally include interlayer cations such as. Na $Ca^{+2}$, $K^+$, $Mg^{+2}$, $Al^{+3}$, $NH_4+$ and the like, including mixtures thereof.

The amount of intercalant intercalated into the swellable layered materials useful in this invention, in order that the intercalated layered material platelets surfaces sufficiently complex with the intercalant molecules such that the layered material may be easily exfoliated or delaminated into individual platelets, may vary substantially between about 2%, preferably at least about 10%, and about 20%, based on the dry weight of the layered silicate material. In the preferred embodiments of the invention, amounts of intercalants employed, with respect to the dry weight of layered material being intercalated, will preferably range from about 8 grams of intercalant 100 grams of layered material (dry basis), preferably at least about 10 grams of intercalant 100 grams of layered material to about 200 grams intercalant 100 grams of layered material. More preferred amounts are from about 20 grams intercalant per 100 grams of layered material to about 60 grams intercalant per 100 grams of layered material (dry basis).

The intercalants are introduced into (sorbed within) the interlayer spaces of the layered material in one of two ways. In a preferred method of intercalating, the layered material is intimately mixed, e.g., by extrusion or pug milling, to form an intercalating composition comprising the layered material, in an intercalant and water solution, or intercalant, water and an organic carrier for the intercalant. To achieve sufficient intercalation for exfoliation, the layered material/intercalant blend contains at least about 8% by weight, preferably at least about 10% by weight intercalant, based on the dry weight of the layered material. The intercalant carrier (preferably water, with or without an organic solvent) can be added by first solubilizing or dispersing the intercalant in the carrier; or a dry intercalant and relatively dry phyllosilicate (preferably containing at least about 4% by weight water) can be blended and the intercalating carrier added to the blend, or to the phyllosilicate prior to adding the dry intercalant. In every case, it has been found that surprising sorption and complexing of intercalant between platelets is achieved at relatively low loadings of intercalating carrier, especially $H_2O$, e.g., at least about 4% by weight water, based on the dry weight of the phyllosilicate. When intercalating the phyllosilicate in slurry form (e.g., 900 pounds water, 100 pounds phyllosilicate, 25 pounds intercalant) the amount of water can vary from a preferred minimum of at least about 30% by weight water, with no upper limit to the amount of water in the intercalating composition (the phyllosilicate intercalate is easily separated from the intercalating composition).

Alternatively, the intercalating carrier, e.g., water, with or without an organic solvent, can be added directly to the phyllosilicate prior to adding the intercalant, either dry or in solution. Sorption of the intercalant molecules may be performed by exposing the layered material to dry or liquid intercalants in the intercalating composition containing at least about 2% by weight, preferably at least about 5% by weight intercalant, more preferably at least about 50% intercalant, based on the dry weight of the layered material. Sorption may be aided by exposure of the intercalating composition to heat, pressure, ultrasonic cavitation, or microwaves.

In accordance with another method of intercalating the intercalant between the platelets of the layered material and exfoliating the intercalate, the layered material, containing at least about 4% by weight water, preferably about 10% to about 15% by weight water, is blended with a water and/or organic solvent solution of an intercalant in a ratio sufficient to provide at least about 8% by weight, preferably at least about 10% by weight intercalant, based on the dry weight of the layered material. The blend then preferably is extruded for faster intercalation of the intercalant with the layered material.

Figure 4:
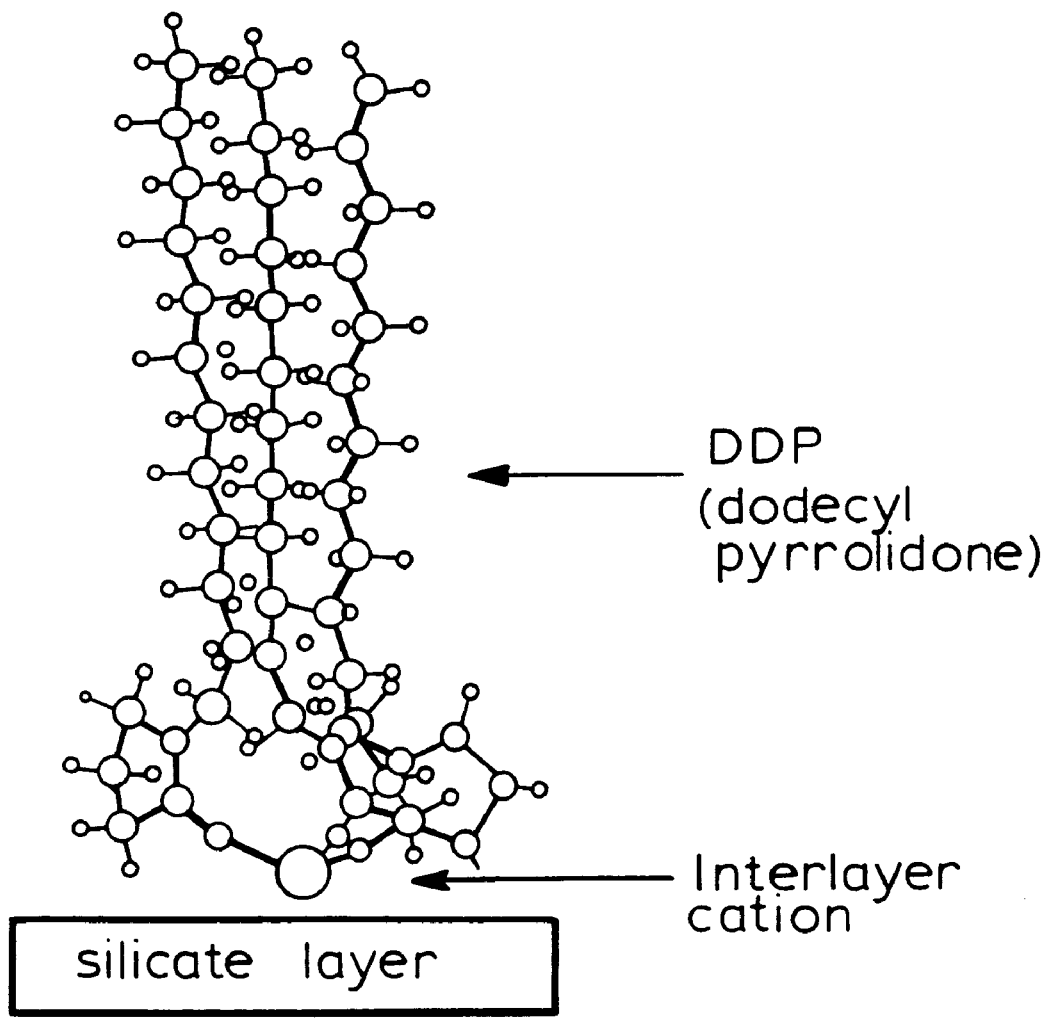
FIG. 4 is a schematic diagram of a dodecylpyrrolidone (DDP) intercalant molecule electrostatically complexed to an interlayer cation ($Na^+$) of a layered material (silicate layer)

The intercalant has an affinity for the phyllosilicate, as shown in FIG. 4, so that it is sorbed between, and is maintained associated with the cations, e.g., the $Na^+$ cations, on the inner surfaces of the silicate platelets, in the interlayer spaces, and remains complexed to the platelet surface after exfoliation. In accordance with the present invention, the intercalant should include a polar end capable of electrostatically complexing to the interlayer cations to be sufficiently bound to the platelet surfaces, it is hereby theorized, by a mechanism selected from the group consisting of ionic complexing; electrostatic complexing; chelation; hydrogen bonding; ion-dipole; dipole/dipole; Van Der Waals forces; and any combination thereof. Such bonding, via a metal cation (e.g., $Na^+$) of the phyllosilicate sharing electrons with electronegative atoms of one or more polar intercalant molecule ends of one or two intercalant molecules, to an inner surface of the phyllosilicate platelets provides adherence between the polar intercalant molecule ends and the platelet inner surfaces of the layered material. Such intercalants have sufficient affinity for the phyllosilicate platelets to maintain sufficient interlayer spacing for exfoliation, without the need for coupling agents or spacing agents, such as the onium ion or silane coupling agents disclosed in the above-mentioned prior art.

Figure 3:
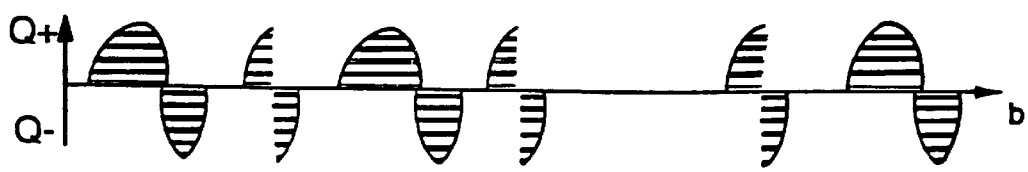
FIG. 3 is a schematic representation of the charge distribution on the surfaces of sodium montmorillonite clay platelets showing the distribution of positive and negative charges on the clay platelet surfaces as a result of the natural disposition of the Na, Mg, Al; Si, and oxygen (Ox) atoms of the clay shown in FIGS. 1 and 2.

As shown in FIGS. 1–3, the disposition of surface cations: $Na^+$, $Mg^{+2}$ and $Al^{+3}$ ions with respect to the disposition of oxygen (Ox) and Si atoms, and the natural clay substitution of $Mg^{+2}$ cations for $Al^{+3}$ cations, leaving a net negative charge at the sites of substitution, results in a clay surface charge distribution as shown in FIG. 3. This alternating positive to negative surface charge over spans of the clay platelets surfaces, and on the clay platelet surfaces in the interlayer spacing, provide for excellent dipole/dipole attraction of a polar intercalant molecule, as shown schematically in FIG. 4, for intercalation of the clay and for bonding or complexing of such polar molecules on the platelet surfaces, after exfoliation.

It is preferred that the platelet loading be less than about 10% by weight for purposes of increasing the viscosity of an organic liquid carrier. Platelet particle loadings within the range of about 0.05% to about 40% by weight, preferably about 0.5% to about 20%, more preferably about 1% to about 10% of the composite material significantly enhances viscosity. In general, the amount of platelet particles incorporated into a liquid carrier, such as a polar solvent, e.g., a glycol such as glycerol, is less than about 90% by weight of the mixture, and preferably from about 0.01% to about 80% by weight of the composite material mixture, more preferably from about 0.05% to about 40% by weight of the mixture, and most preferably from about 0.05% to about 20% or 0.05% to about 10% by weight.

In accordance with an important feature of the present invention, the intercalated phyllosilicate can be manufactured in a concentrated form, e.g., 10–200%, preferably 20–100% intercalant with or without another polar organic compound carrier and 10–90%, preferably 20–80% intercalated phyllosilicate that can be dispersed in the polar organic carrier and exfoliated before or after addition to the carrier to a desired platelet loading.

Suitable aromatic ring-containing intercalant or intercalant surface modifier compounds include compounds such 4-(2-oxo-pyrrolidin-1-yl)-benzoic acid; 3-(2-oxo-pyrrolidin-1-yl)-benzoic acid; 4-(2-oxo-pyrrolidin-1-ylmethyl)-benzoic acid; 2-methyl-3-(2-oxo-pyrrolidin-1-yl)-benzoic acid; 2-methyl-5-(2-oxo-pyrrolidin-1-yl)-benzoic acid; 3-methyl-4-(2-oxo-pyrrolidin-1-yl)-benzoic acid and mixtures thereof. Structures for the above-named aromatic ring-containing compounds are as follows:

4-(2-oxo-pyrrolidin-1-yl)-benzoic acid

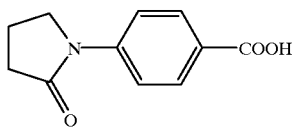

3-(2-oxo-pyrrolidin-1-yl)-benzoic acid

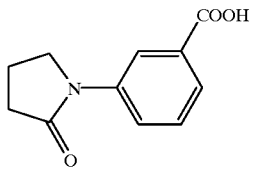

4-(2-oxo-pyrrolidin-1-ylmethyl)-benzoic acid

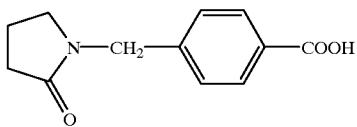

2-methyl-3-(2-oxo-pyrrolidin-1-yl-benzoic acid

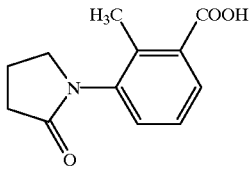

2-methyl-5-(2-oxo-pyrrolidin-1-yl) -benzoic acid

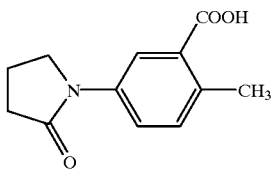

3-methyl-4-(2-oxo-pyrrolidin-1-yl) -benzoic acid

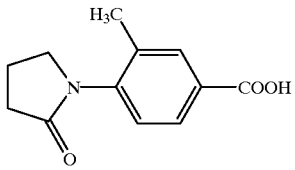

Polar organic compound matrix materials containing one or more hydroxy functionalities are suitable for use as intercalant surface modifiers so long as the hydroxy end of the molecule has a dipole moment greater than the dipole moment of water (>1.85 D), and the polar organic compounds have a long chain ($C_6+$) alkyl radical or an aromatic ring that includes a matrix material—compatible functionality. Other examples include long chain ($C_6+$) alcohols having a dipole moment greater than 1.85 D, including aliphatic alcohols; aromatic alcohols; aryl substituted aliphatic alcohols; alkyl substituted aromatic alcohols; and polyhydric alcohols, such as the phenols, containing a long chain ($C_6+$) alkyl group.

Detergent range aliphatic alcohols having an alkyl radical of at least 6 carbon atoms include the $C_6$—$C_{24}$ alcohols, such as hexyl alcohol; heptyl alcohol; octyl alcohol; nonyl alcohol; the $C_6$—$C_{18}$ alcohols manufactured from coconut, tallow and/or palm oils; $C_{16}$, $C_{18}$ oleyl alcohols; $C_{10}$–$C_{15}$ mixed alcohols, $C_{10}$–$C_{22}$ mixed alcohols; and $C_{13}$, $C_{15}$ alcohols manufactured from ethylene and other olefins. Additional detergent range alcohols include lauryl alcohol; myristyl alcohol; cetyl alcohol; tallow alcohol; stearyl alcohol; and oleyl alcohol. Branched detergent range alcohols, such as tridecyl alcohol ($C_{13}H_{28}O$), consisting predominantly of tetramethyl-1-nonanols also are suitable as the intercalant monomer and/or as a polar organic liquid carrier. Plasticizer range alcohols include decanol ($C_{10}H_{22}O$); and tridecyl alcohol ($C_{13}H_{28}O$).

REPRESENTATIVE STRAIGHT-CHAIN ALKANOIC ACIDS, $C_nH_{2n}O_2$ SYSTEMATIC NAME (COMMON NAME)

Hexanoic; heptanoic; octanoic; decanoic ([capric]); undecanoic ([undecylic]); dodecanoic (lauric); tridecanoic ([tridecylic]); tetradecanoic (myristic); pentadecanoic ([pentadecylic]); hexadecanoic (palmitic); heptadecanoic (margaric); octadecanoic (stearic); nonadecanoic ([nonadecyclic]); eicosanoic (arachidic); docosanoic (behenic); tetracosanoic (lignoceric); hexacosanoic (cerotic); octacosanoic (montanic); triacontanoic (melissic); tritriacontanoic (psyllic); and pentatriacontanoic (ceroplastic).

REPRESENTATIVE STRAIGHT-CHAIN ALKENOIC ACIDS, $C_nH_{R(2n-2)}O_2$ SYSTEMATIC NAME (COMMON NAME)

Trans-4-decenoic; cis-4-decenoic; 9-decenoic (caproleic); 10-undecenoic (undecylenic); trans-3-dodecenoic (linderic); tridecenoic; cis-9-tetradecenoic (myristoleic); pentadecenoic; cis-9-hexadecenoic (cis-9-palmitoleic); trans-9-hexadecenoic (trans-9-palmitoleic); 9-heptadecenoic; cis-6-octadecenoic (petroselinic); trans-6-octadecenoic (petroselaidic); cis-9-octadecenoic (oleic); trans-9-octadecenoic (elaidic); cis-11-octadecenoic; trans-11-octadecenoic (vaccenic); cis-5-eicosenoic; cis-9-eicosenoic (gadoleic); cis-11-docosenoic (cetoleic); cis-13 docosenoic (erucic); trans-13-docosenoic (brassidic); cis-15-tetracosenoic (selacholeic); cis-17-hexacosenoic (ximenic); and cis-21-triacontenoic (lumequeic).

REPRESENTATIVE POLYUNSATURATED FATTY ACIDS SYSTEMATIC NAME (COMMON NAME)

REPRESENTATIVE DIENOIC ACIDS, $CnH_{2n-4}O_2$

Trans-2,4-decadienoic, trans-2,4-dodecadienoic; cis- 9,cis-12-octadecadienoic (linoleic); trans-9,trans-12-octadecadienoic (linolelaidic); 5,6-octadecadienoic (laballenic); and 5,13-docosadienoic.

REPRESENTATIVE TRIENOIC ACIDS, $CnH_{2n-6}O_2$ 6,10,14-hexadecatrienoic (hiragonic); cis-9,cis-12,cis-15-octadecatrienoic (linolenic); cis-9,trans-11-trans-13-octadecatrienoic (α-eleostearic); trans-9,trans-11,trans-13-octadecatrienoic (β-eleostearic); cis-9,cis-11,trans-13-octadecatrienoic (punicic); and trans-9,trans-12,trans-15-octadecatrienoic (linolenelaidic).

REPRESENTATIVE TETRAENOIC ACIDS, $C_nH_{2N-8}O_2$ 4,8,12,15 octadecatetraenoic (moroctic); cis-9,trans-11,trans-13,cis-15-octadecatetraenoic (α-parinaric); trans-9,trans-11,trans-13,trans-15-octadecatetraenoic (β-parinaric); and 5,8,11,14-eicosatetraenoic (arachidonic).

REPRESENTATIVE SUBSTITUTED ACIDS SYSTEMATIC NAME (COMMON NAME)

2,15,16-trihydroxyhexadecanoic (ustilic); 9,10,16-trihydroxyhexadecanoic (aleuritic); 16-hydroxy-7-hexadecenoic (ambrettolic); 12-hydroxy-cis-9-octadecenoic (ricinoleic); 12-hydroxy-trans-9-octadecenoic (ricinelaidic); 4-oxo-9,11,13-octadecatrienoic (licanic); 9,10-dihydroxyoctadecanoic; 12-hydroxyoctadecanoic; 12-oxooctadecanoic; 18-hydroxy-9,11,13-octadecatrienoic (kamlolenic); 12,13-epoxy-cis-9-octadecenoic (vernolic); 8-hydroxy-trans-11-octadecene-9-ynoic (ximenynolic); 8-hydroxy-17-octadecene-9,11-diynoic (isanolic); and 14-hydroxy-cis-11-eicosenoic (lesquerolic).

REPRESENTATIVE LONG CHAIN ($C_6+$) CARBOXYLIC ACIDS AND USES

ACID n-valeric canola castor oil acids (ricinoleic, 12-hydroxystearic)

coconut oil acids hydrogenated and/or separated tallow-based acids soybean oil acids tall oil acids 2% or more rosin less than 2% tallow fatty acids capric caprylic caprylic-capric blend lauric, 95% (dodecanoic)

myristic, 95% (tetradecanoic)

oleic palmitic, 90% pelargonic (nonanoic) stearic, 90%

TRIALKYLACETIC ACIDS

Trialkylacetic acids are characterized by the following structure:

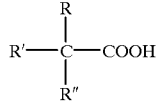

in which R, R', and R" are $C_xH_{2x+1}$, with $x \geq 1$, and wherein at least one of the R, R' and R" have at least 10 carbon atoms. The series, the products are typically mixtures of isomers, resulting from the use of mixed isomer feedstocks and the chemical rearrangements that occur in the manufacturing process.

The trialkylacetic acids have a number of uses in areas such as polymers, pharmaceuticals, agricultural chemicals, cosmetics, and metal-working fluids. Commercially important derivatives of these acids include acid chlorides, peroxyesters, metal salts, vinyl esters, and glycidyl esters.

The $C_{10}$ trialkylacetic acids, referred to as neodecanoic acid or as Versatic 10, are liquids at room temperature. Typical physical properties for commercially available material are given in Table 2. These materials are typically mixtures of isomers.

ALD DES

Representative aldehydes suitable as the intercalant and/ or as the polar organic carrier matrix material in accordance with the present invention include the following:

hexyl aldehyde; heptyl aldehyde; octyl aldehyde; nonyl aldehyde; decyl aldehyde; dodecyl aldehyde; octodecyl aldehyde; eicosan aldehyde; phenyl acetaldehyde; and the like.

USES

Fatty aldehydes are used in nearly all perfume types and aromas. Polymers and copolymers of aldehydes exist and are of commercial significance.

KETONES

Suitable ketones are the organic compounds that contain one or more carbonyl groups bound to two aliphatic, aromatic, or alicyclic substituents, and are represented by the general formula

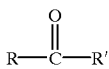

wherein R and/or R' is an alkyl group having at least 6 carbon atoms.

AMINES AND AMIDES

Polar organic compounds containing one or more amine or amide functionalities that are suitable for use as intercalate monomers and/or as the organic liquid carrier (matrix monomer) in accordance with the present invention include all organic amines and/or amides, such as the alkylamines; aminocycloalkanes and substituted aminocycloalkanes; cycloaliphatic diamines; fatty amines; and fatty amides, having a long chain ($C_6+$) alkyl group and having a dipole moment greater than the dipole moment of water.

Amines and amides are suitable alone, or in admixture, as the intercalant monomer(s) and/or as the organic solvent carrier (matrix monomer), for intercalation of the phyllosilicate and/or for admixture with the exfoliated individual platelets of the layered material in producing the nanocomposite of the present invention. The amines and amides can be any primary, secondary and/or tertiary amines or amides; including the long chain alkyl ($C_6+$) aliphatic amines; $C_6+$ alkylamines; fatty amines; $C_6+$ alkyl aromatic amines; $C_6+$ alkyl diarylamines; $C_6+$ alkyl substituted alkanolamines; and the like.

Examples of suitable amines that are useful as the intercalant monomer used for intercalation and exfoliation of the layered silicate materials, and/or as the polar organic carrier for admixture with the individual platelets in forming nanocomposite compositions are as follows:

REPRESENTATIVE FATTY AMINES

| FATTY AMINE | MOLECULAR FORMULA |
|---|---|
| REPRESENTATIVE PRIMARY AMINES | |
| 1-hexylamine | $C_6H_{15}N$ |
| 1-heptylamine | $C_7H_{17}N$ |
| 1-octylamine | $C_8H_{19}N$ |
| 1-nonylamine | $C_9H_{21}N$ |
| cocoalkylamines | |
| 1-dodecylamine | $C_{12}H_{27}N$ |
| 1-hexadecylamine | $C_{16}H_{35}N$ |
| 1-octadecylamine | $C_{18}H_{39}N$ |
| oleylamine | $C_{18}H_{37}N$ |
| soyaalkylamines | |
| tallowalkylamines | |
| hydrogenated tallowalkylamines | |

| FATTY AMINE | MOLECULAR FORMULA |
|---|---|
| REPRESENTATIVE SECONDARY AMINES | |
| dicocoalkylamines | |
| di-n-dodecylamine | $C_{24}H_{51}N$ |
| di-n-hexadecylamine | $C_{32}H_{67}N$ |
| di-n-octadecylamine | $C_{36}H_{75}N$ |
| ditallowalkylamines | |
| dihydrogenated tallowalkylamines | |
| REPRESENTATIVE TERTIARY AMINES | |
| Alkyldimethyl | |
| cocoalkyldimethylamines | |
| dimethyl-n-octylamine | $C_{10}H_{23}N$ |
| dimethyl-n-decylamine | $C_{12}H_{27}N$ |
| dimethyl-n-dodecylamine | $C_{14}H_{31}N$ |
| dimethyl-n-tetradecylamine | $C_{16}H_{35}N$ |
| dimethyl-n-hexadecylamine | $C_{18}H_{39}N$ |
| dimethyl-n-octadecylamine | $C_{20}H_{43}N$ |
| dimethyloleylamine | $C_{20}H_{41}N$ |
| Dialkylmethyl | |
| di-n-decylmethylamine | $C_{21}H_{45}N$ |
| dicocoalkylmethylamines | |
| dihydrogenated tallowalkylmethylamines | |

| FATTY AMINE | MOLECULAR FORMULA |
|---|---|
| Trialkyl | |
| tri-n-octylamine | $C_{24}H_{51}N$ |
| tri-n-dodecylamine | $C_{36}H_{75}N$ |
| tri-n-hexadecylamines | |

NANOCOMPOSITE USES

Fatty amines and chemical products derived from the amines are used in many industries. Uses for the nitrogen derivatives are as follows: fabric softeners, oil field chemicals, asphalt emulsifiers, petroleum additives, and mining.

Amine salts, especially acetate salts prepared by neutralization of a fatty amine with acetic acid, are useful as flotation agents (collectors), corrosion inhibitors, and lubricants.

Fatty amines and derivatives are widely used in the oil field, as corrosion inhibitors, surfactants, emulsifying/deemulsifying and gelling agents. In the mining industry, amines and diamines are used in the recovery and purification of minerals, e.g., by flotation. A significant use of fatty diamines is as asphalt emulsifiers for preparing asphalt emulsions. Diamines have also been used as epoxy curing agents, corrosion inhibitors, gasoline and fuel oil additives, and pigment wetting agents. In addition, derivatives of the amines, amphoterics, and long-chain alkylamines are used as anionic and cationic surfactants in the personal care industry.

The amides including, primary, secondary and tertiary amides are useful in accordance with the present invention as intercalant monomers and/or as polar organic carriers that the individual phyllosilicate platelets are dispersed in. Representative primary fatty amides are as follows:

PRIMARY FATTY AMINE (RCONH$_2$)

| Common Name | Molecular Formula | IUPAC Name |
|---|---|---|
| ALKYL | | |
| hexylamide | C$_6$H$_{13}$NO | |
| heptylamide | C$_7$H$_{15}$NO | |
| octylamide | C$_8$H$_{17}$NO | |
| nonylamide | C$_9$H$_{19}$NO | |
| lauramide | C$_{12}$H$_{25}$NO | dodecylamide |
| myristamide | C$_{14}$H$_{29}$NO | tetradecylamide |
| palmitamide | C$_{16}$H$_{33}$NO | hexadecylamide |
| stearamide | C$_{18}$H$_{37}$NO | |
| ALKENYL | | |
| hexenamide | C$_6$H$_{11}$NO | |
| heptenamide | C$_7$H$_{13}$NO | |
| octenamide | C$_8$H$_{15}$NO | |

| Common Name | Molecular Formula | IUPAC Name |
|---|---|---|
| nonenamide | C$_9$H$_{17}$NO | |
| palmitoleamide | C$_{16}$H$_{31}$NO | hexadecenamide |
| oleamide | C$_{18}$H$_{35}$NO | 9-octadecenamide |
| linoleamide | C$_{18}$H$_{33}$NO | 9,12-octadecadienamide |

Polar organic compounds having a long chain (C$_6$+) alkyl group with a matrix material-compatible functionality, and containing one or more ether or ester functionalities that are suitable for use as intercalants (surface modifiers) and/or as the organic liquid carrier (matrix material) in accordance with the present invention include the organic ethers and/or esters, such as the saturated, unsaturated, cyclic, aromatic, and carboxylic ethers and esters that contain a C$_6$+ alkyl group and having a polar end group that provides the molecule with a dipole moment greater than the dipole moment of water, capable of electrostatic complexing with the interlayer cations, particularly with the interlayer Na$^+$ ions.

REPRESENTATIVE ALKYL NITRILES

Suitable nitriles having an alkyl radical of at least 6 carbon atoms, and a dipole moment greater than the dipole moment of water include hexanonitrile (CH$_3$(CH$_2$)$_5$CN); heptanonitrile (CH$_3$ (CH$_2$)$_6$CN); octanonitrile (CH$_3$(CH$_2$)$_7$CN); nonanonitrile (CH$_3$(CH$_2$)$_7$CN); undecanonitrile (CH$_3$(CH$_2$)$_9$CN); dodecanonitrile (or lauronitrile) (CH$_3$ (CH$_2$)$_{11}$CN); myristonitrile (CH$_3$(CH$_2$)$_{12}$CN); pentadecanonitrile (CH$_3$(CH$_2$)$_{13}$CN); n-heptadecanonitrile (CH$_3$ (CH$_2$)$_{15}$CN); n-nonadecanitrile (CH$_3$(CH$_2$)$_{17}$CN); and mixtures thereof.

REPRESENTATIVE N-ALKYL LACTAMS, INCLUDING N-ALKYL PYRROLIDONES AND CAPROLACTAMS

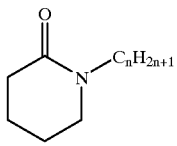

n=at least 1, preferably at least 6, more preferably 10–20.

REPRESENTATIVE PYRIDINES

Suitable pyridines include hexylpyridinium chloride (C$_5$H$_5$NC$_6$H$_{13}$Cl); heptylpyridinium chloride (C$_5$H$_5$NC$_7$H$_{15}$Cl); octylpyridinium chloride (C$_5$H$_5$NC$_8$H$_{17}$Cl); nonylpyridium chloride (C$_5$H$_5$NC$_9$H$_{19}$Cl); dodecylpyridinium chloride (C$_5$H$_5$NC$_{12}$H$_{25}$Cl); dodecylpyridinium bromide (C$_5$H$_5$NC$_{12}$H$_{25}$Br); hexadecylpyridinium chloride (C$_5$H$_5$NC$_{16}$H$_{33}$Cl); hexadecylpyridinium bromide (C$_5$H$_5$NC$_{16}$H$_{33}$Br); and mixtures thereof.

REPRESENTATIVE N-ALKYL HALIDES n=at least 6, and preferably 10–20,
M=a halogen atom (Cl, F, Br, I, At).

REPRESENTATIVE ALKYL-SUBSTITUTED LACTONES

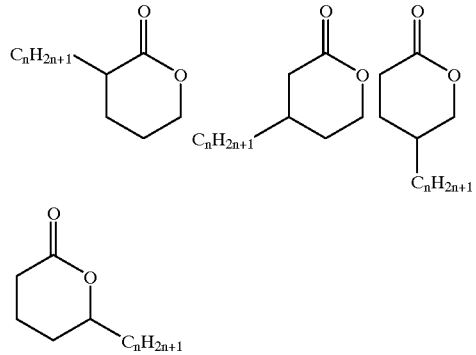

REPRESENTATIVE ESTERS

Other useful, representative esters include methyl stearate; ethyl stearate; butyl stearate; dodecyl stearate; hexadecyl stearate; dimethyl maleate; dimethyl oxalate; dimethyl adipate; diethyl adipate; di(2-ethylhexyl) adipate; methyl salicylate; ethyl salicylate; methyl anthranilate; benzyl cinnamate; and mixtures thereof.

REPRESENTATIVE CARBOXYLIC ESTERS

Plasticizers
  Hexyl adipate;
  Heptyl adipate;
  Octyl adiptate;
  Isodecyl adipate;
  Epoxidized esters;
  Sebacic acid esters, such as dibutyl sebacate;
  Stearic acid esters, such as isobutyl stearate.

Surface-Active Agents

Carboxylic acid esters; and anhydrosorbitol esters, such as anhydrosorbitol monolaurate; anhydrosorbitol monooleate; and anhydrosorbitol monostearate.

Ethylene glycol esters, such as ethylene glycol monolaurate.

Ethoxylated anhydrosorbitol esters, such as ethoxylated anhydrosorbitol monolaurate; ethoxylated anhydrosorbitol monooleate; ethoxylated anhydrosorbitol monostearate; ethoxylated anhydrosorbitol tristearate; ethylene glycol distearate; and ethylene glycol monostearate.

Glycerol esters, such as glycerol dilaurate; glycerol monooleate; and glycerol monostearate.

Ethoxylated natural fats and oils, such as ethoxylated castor oil, ethoxylated hydrogenated castor oil; and ethoxylated lanolin.

Poly(ethylene glycol) esters, such as poly(ethylene glycol) diester of tall oil acids; poly(ethylene glycol dilaurate); poly(ethylene glycol distearate); poly(ethylene glycol monolaurate); poly(ethylene glycol monopalmitate); poly(ethylene glycol monostearate); poly(ethylene glycol) sesquiester of tall oil acids; poly(glycerol monooleate); poly(glycerol monostearate); and 1,2-propanediol monostearate.

Miscellaneous Esters

Fatty acid esters, not included with plasticizers or surface-active agents include methyl esters of tallow; and myristyl myristate.

Polyhydric alcohol esters, such as 2-(2-butoxyethoxy) ethyl acetate; 2-butoxyethyl acetate; and glycerides, mixed $C_{14-18}$ and $C_{16-18}$, mono- and di-.

Ethers suitable as the intercalant surface modifier and/or as the polar organic carrier (Matrix Monomer) containing dispersed, individual silicate platelets, in accordance with the present invention, are compounds of the general formula Ar—O—R, and R—O—R' where Ar is an aryl group and R is an alkyl group having at least 6 carbon atoms.

In accordance with another embodiment of the present invention, the intercalates or surface modifiers can be exfoliated and dispersed into one or more melt-processible thermoplastic and/or thermosetting matrix oligomers or polymers, or mixtures thereof. Matrix polymers for use in this embodiment of the process of this invention may vary widely, the only requirement is that they are melt processible. In this embodiment of the invention, the polymer includes at least ten (10), preferably at least thirty (30) recurring monomeric units. The upper limit to the number of recurring monomeric units is not critical, provided that the melt index of the matrix polymer under use conditions is such that the matrix polymer forms a flowable mixture. Most preferably, the matrix polymer includes from at least about 10 to about 100 recurring monomeric units. In the most preferred embodiments of this invention, the number of recurring units is such that the matrix polymer has a melt index of from about 0.01 to about 12 grams per 10 minutes at the processing temperature.

Thermoplastic resins and rubbers for use as matrix polymers in the practice of this invention may vary widely. Illustrative of useful thermoplastic resins, which may be used alone or in admixture, are polyactones such as poly (pivalolactone), poly(caprolactone) and the like; polyurethanes derived from reaction of diisocyanates such as 1,5-naphthalene diisocyanate; p-phenylene diisocyanate, m-phenylene diisocyanate, 2,4-toluene diisocyanate, 4,4'-diphenylmethane diisocyanate, 3,3'-dimethyl-4,4'-biphenyl diisocyanate, 4,4'-diphenylisopropylidene diisocyanate, 3,3'-dimethyl-4,4'-diphenyl diisocyanate, 3,3'-dimethyl-4,4'-diphenylmethane diisocyanate, 3,3'-dimethoxy-4,4'-biphenyl diisocyanate, dianisidine diisocyanate, toluidine diisocyanate, hexamethylene diisocyanate, 4,4'-diisocyanatodiphenylmethane and the like and linear long-chain diols such as poly(tetramethylene adipate), poly (ethylene adipate), poly(1,4-butylene adipate), poly (ethylene succinate), poly(2,3-butylene succinate), polyether diols and the like; polycarbonates such as poly [methane bis(4-phenyl) carbonate], poly[1,1-ether bis(4-phenyl) carbonate], poly[diphenylmethane bis(4-phenyl) carbonate), poly[1,1-cyclohexane bis(4-phenyl)carbonate] and the like; polysulfones; polyethers; polyketones; polyamides such as poly(4-amino butyric acid), poly (hexamethylene adipamide), poly(6-aminohexanoic acid), poly(m-xylylene adipamide), poly(p-xylylene sebacamide), poly(2,2,2-trimethyl hexamethylene terephthalamide), poly (metaphenylene isophthalamide) (NOMEX), poly(p-phenylene terephthalamide) (KEVLAR), and the like; polyesters such as poly(ethylene azelate), poly(ethylene-1,5-naphthalate), poly(1,4-cyclohexane dimethylene terephthalate), poly(ethylene oxybenzoate) (A-TELL), poly (parahydroxy benzoate) (EKONOL), poly(1,4-cyclohexylidene dimethylene terephthalate) (KODEL) (cis), poly(1,4-cyclohexylidene dimethylene terephthalate) (KODEL) (trans), polyethylene terephthalate, polybutylene terephthalate and the like; poly(arylene oxides) such as poly(2,6-dimethyl-1,4-phenylene oxide), poly(2,6-diphenyl-1,4-phenylene oxide) and the like; poly(arylene sulfides) such as poly(phenylene sulfide) and the like; polyetherimides; vinyl polymers and their copolymers such as polyvinyl acetate, polyvinyl alcohol, polyvinyl chloride; polyvinyl butyral, polyvinylidene chloride, ethylene-vinyl acetate copolymers, and the like; polyacrylics, polyacrylate and their copolymers such as polyethyl acrylate, poly(n-butyl acrylate), polymethylmethacrylate, polyethyl methacrylate, poly(n-butyl methacrylate), poly(n-propyl methacrylate), polyacrylamide, polyacrylonitrile, polyacrylic acid, ethylene-acrylic acid copolymers, ethylene-vinyl alcohol copolymers acrylonitrile copolymers, methyl methacrylate-styrene copolymers, ethylene-ethyl acrylate copolymers, methacrylated butadiene-styrene copolymers and the like; polyolefins such as low density poly(ethylene), poly(propylene), chlorinated low density poly(ethylene), poly(4-methyl-1-pentene), poly(ethylene), poly(styrene), and the like; ionomers; poly(epichlorohydrins); poly (urethane) such as the polymerization product of diols such as glycerin, trimethylol-propane, 1,2,6-hexanetriol, sorbitol, pentaerythritol, polyether polyols, polyester polyols and the like with a polyisocyanate such as 2,4-tolylene diisocyanate, 2,6-tolylene diisocyante, 4,4'-diphenylmethane diisocyanate, 1,6-hexamethylene diisocyanate, 4,4'-dicyclohexylmethane diisocyanate and the like; and polysulfones such as the reaction product of the sodium salt of 2,2-bis(4-hydroxyphenyl) propane and 4,4'-dichlorodiphenyl sulfone; furan resins such as poly(furan); cellulose ester plastics such as cellulose acetate, cellulose acetate butyrate, cellulose propionate and the like; silicones such as poly(dimethyl siloxane), poly(dimethyl siloxane co-phenylmethyl siloxane), and the like; protein plastics; and blends of two or more of the foregoing.

Vulcanizable and thermoplastic rubbers useful as matrix polymers in the practice of this embodiment of the invention may also vary widely. Illustrative of such rubbers are brominated butyl rubber, chlorinate butyl rubber, polyurethane elastomers, fluoroelastomers, polyester elastomers, polyvinylchloride, butadiene/acrylonitrile elastomers, silicone elastomers, poly(butadiene), poly(isobutylene), ethylene-propylene copolymers, ethylene-propylene-diene terpolymers, sulfonated ethylene-propylene-diene terpolymers, poly(chloroprene), poly(2,3-dimethylbutadiene), poly(butadiene-pentadiene), chlorosulphonated poly(ethylenes), poly(sulfide) elastomers, block copolymers, made up of segments of glassy or crystalline blocks such as poly(styrene), poly(vinyl-toluene), poly(t-butyl styrene), polyesters and the like and the elastomeric blocks such as poly(butadiene), poly(isoprene), ethylene-propylene copolymers, ethylene-butylene copolymers, polyether and the like as for example the copolymers in poly (styrene)-poly(butadiene)-poly(styrene) block copolymer manufactured by Shell Chemical Company under the trade name KRATON®.

Useful thermosetting resins useful as matrix polymers include, for example, the polyamides; polyalkylamides; polyesters; polyurethanes; polycarbonates; polyepoxides; and mixtures thereof.

Most preferred thermoplastic polymers for use as a matrix polymer are thermoplastic polymers such as polyamides, polyesters, and polymers of alpha-beta unsaturated monomers and copolymers. Polyamides which may be used in the process of the present invention are synthetic linear polycarbonamides characterized by the presence of recurring carbonamide groups as an integral part of the polymer chain which are separated from one another by at least two carbon atoms. Polyamides of this type include polymers, generally known in the art as nylons, obtained from diamines and dibasic acids having the recurring unit represented by the general formula:

—NHCOR$^{13}$COHNR$^{14}$— in which R$^{13}$ is an alkylene group of at least 2 carbon atoms, preferably from about 2 to about 11, or arylene having at least about 6 carbon atoms, preferably about 6 to about 17 carbon atoms; and R$^{14}$ is selected from R$^{13}$ and aryl groups. Also, included are copolyamides and terpolyamides obtained by known methods, for example, by condensation of hexamethylene diamine and a mixture of dibasic acids consisting of terephthalic acid and adipic acid. Polyamides of the above description are well-known in the art and include, for example, the copolyamide of 30% hexamethylene diammonium isophthalate and 70% hexamethylene diammonium adipate, poly(hexamethylene adipamide) (nylon 6,6), poly(hexamethylene sebacamide) (nylon 6, 10), poly(hexamethylene isophthalamide), poly(hexamethylene terephthalamide), poly(heptamethylene pimelamide) (nylon 7,7), poly(octamethylene sebacamide) (nylon 8,8), poly (nonamethylene azelamide) (nylon 9,9) poly(decamethylene azelamide) (nylon 10,9), poly(decamethylene sebacamide) (nylon 10,10), poly bis(4-amino cyclohexyl)methane-1,10-decane-carboxamide)], poly(m-xylylene adipamide), poly (p-xylylene sebacamide), poly(2,2,2-trimethyl hexamethylene terephthalamide), poly(piperazine sebacamide), poly(p-phenylene terephthalamide), poly(metaphenylene isophthalamide) and the like.

Other useful polyamides for use as a matrix polymer are those formed by polymerization of amino acids and derivatives thereof, as, for example, lactams. Illustrative of these useful polyamides are poly(4-aminobutyric acid) (nylon 4), poly(6-aminohexanoic acid) (nylon 6), poly(7-aminoheptanoic acid) (nylon 7), poly(8-aminooctanoic acid) (nylon 8), poly(9-aminononanoic acid) (nylon 9), poly(10-aminodecanoic acid) (nylon 10), poly(11-aminoundecanoic acid) (nylon 11), poly(12-aminododecanoic acid) (nylon 12) and the like.

Preferred polyamides for use as a matrix polymer are poly(caprolactam), poly(12-aminododecanoic acid) and poly(hexamethylene adipamide).

Other matrix or host polymers which may be employed in admixture with exfoliates to form nanocomposites are linear polyesters. The type of polyester is not critical and the particular polyesters chosen for use in any particular situation will depend essentially on the physical properties and features, i.e., tensile strength, modulus and the like, desired in the final form. Thus, a multiplicity of linear thermoplastic polyesters having wide variations in physical properties are suitable for use in admixture with exfoliated layered material platelets in manufacturing nanocomposites in accordance with this invention.

The particular polyester chosen for use as a matrix polymer can be a homo-polyester or a copolyester, or mixtures thereof, as desired. Polyesters are normally prepared by the condensation of an organic dicarboxylic acid and an organic diol, and, the reactants can be added to the intercalates, or exfoliated intercalates for in situ polymerization of the polyester while in contact with the layered material, before or after exfoliation of the intercalates.

Polyesters which are suitable for use as matrix polymers in this embodiment of the invention are those which are derived from the condensation of aromatic, cycloaliphatic, and aliphatic diols with aliphatic, aromatic and cycloaliphatic dicarboxylic acids and may be cycloaliphatic, aliphatic or aromatic polyesters.

Exemplary of useful cycloaliphatic, aliphatic and aromatic polyesters which can be utilized as matrix polymers in the practice of this embodiment of the invention are poly (ethylene terephthalate.), poly(cyclohexylenedimethylene terephthalate), poly(ethylene dodecate), poly(butylene terephthalate), poly[ethylene(2,7-naphthalate)], poly (methaphenylene isophthalate), poly(glycolic acid), poly (ethylene succinate), poly(ethylene adipate), poly(ethylene sebacate), poly(decamethylene azelate), poly (decamethylene adipate), poly(decamethylene sebacate), poly(dimethylpropiolactone), poly(parahydroxybenzoate) (EKONOL), poly(ethylene oxybenzoate) (A-tell), poly (ethylene isophthalate), poly(tetramethylene terephthalate, poly(hexamethylene terephthalate), poly(decamethylene terephthalate), poly(1,4-cyclohexane dimethylene terephthalate) (trans), poly(ethylene 1,5-naphthalate), poly (ethylene 2,6-naphthalate), poly(1,4-cyclohexylidene dimethylene terephthalate), (KODEL) (cis), and poly(1,4-cyclohexylidene dimethylene terephthalate (KODEL) (trans).

Polyester compounds prepared from the condensation of a diol and an aromatic dicarboxylic acid are especially suitable as matrix polymers in accordance with this embodiment of the present invention. Illustrative of such useful aromatic carboxylic acids are terephthalic acid, isophthalic acid and o-phthalic acid, 1,3-naphthalene-dicarboxylic acid, 1,4-naphthalenedicarboxylic acid, 2,6-naphthalenedicarboxylic acid, 2,7-naphthalenedicarboxylic acid, 4,4'-diphenyldicarboxylic acid, 4,4'-diphenylsulfone-dicarboxylic acid, 1,1,3-trimethyl-5-carboxy-3-(p-carboxyphenyl)-idane, diphenyl ether 4,4'-dicarboxylic acid, bis-p(carboxy-phenyl) methane and the like. Of the aforementioned aromatic dicarboxylic acids, those based on a benzene ring (such as terephthalic acid, isophthalic acid, orthophthalic acid) are preferred for use in the practice of this invention. Among these preferred acid precursors, terephthalic acid is particularly preferred acid precursor.

The most preferred matrix polymer for incorporation with exfoliates manufactured in accordance with the present invention is a polymer selected from the group consisting of poly(ethylene terephthalate), poly(butylene terephthalate), poly(1,4-cyclohexane dimethylene terephthalate), a polyvinylimine, and mixtures thereof. Among these polyesters of choice, poly(ethylene terephthalate) and poly (butylene terephthalate) are most preferred.

Still other useful thermoplastic homopolymers and copolymer matrix polymers for forming nanocomposites with the exfoliates of the present invention are polymers formed by polymerization of alpha-beta-unsaturated monomers or the formula:

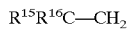

$$R^{15}R^{16}C\text{—}CH_2$$

wherein:

$R^{15}$ and $R^{16}$ are the same or different and are cyano, phenyl, carboxy, alkylester, halo, alkyl, alkyl substituted with one or more chloro or fluoro, or hydrogen. Illustrative of such preferred homopolymers and copolymers are homopolymers and copolymers of ethylene, propylene, vinyl alcohol, acrylonitrile, vinylidene chloride, esters of acrylic acid, esters of methacrylic acid, chlorotrifluoroethylene, vinyl chloride and the like. Preferred are poly(propylene), propylene copolymers, poly (ethylene) and ethylene copolymers. More preferred are poly(ethylene) and poly(propylene).

The mixture may include various optional components which are additives commonly employed with polar organic liquids. Such optional components include nucleating agents, fillers, plasticizers, impact modifiers, chain extenders, plasticizers, colorants, mold release lubricants, antistatic agents, pigments, fire retardants, and the like. These optional components and appropriate amounts are well known to those skilled in the art.

The amount of intercalated and/or exfoliated layered material included in the liquid carrier or solvent compositions to form the viscous compositions suitable to deliver the carrier or some carrier-dissolved or carrier-dispersed active material, such as a pharmaceutical, may vary widely depending on the intended use and desired viscosity of the composition. For example, relatively higher amounts of intercalates, i.e., from about 10% to about 30% by weight of the total composition, are used in forming solvent gels having extremely high viscosities, e.g., 5,000 to 5,000,000 centipoises. Extremely high viscosities, however, also can be achieved with a relatively small concentration of intercalates and/or exfoliates thereof, e.g., 0.1% to 5% by weight, by adjusting the pH of the composition in the range of about 0–6 or about 10–14 and/or by heating the composition above room temperature, e.g., in the range of about 25° C. to about 200° C., preferably about 75° C. to about 100° C. It is preferred that the intercalate or platelet loading be less than about 10% by weight of the composition. Intercalate or platelet particle loadings within the range of about 0.01% to about 40% by weight, preferably about 0.05% to about 20%, more preferably about 0.5% to about 10% of the total weight of the composition significantly increases the viscosity of the composition. In general, the amount of intercalate and/or platelet particles incorporated into the carrier/solvent is less than about 20% by weight of the total composition, and preferably from about 0.05% to about 20% by weight of the composition, more preferably from about 0.01% to about 10% by weight of the composition, and most preferably from about 0.01% to about 5%, based on the total weight of the composition.

In accordance with an important feature of the present invention, the intercalate and/or platelet/carrier compositions of the present invention can be manufactured in a concentrated form, e.g., as a master gel, e.g, having about 10–200%, preferably about 20–80% intercalate and/or exfoliated platelets of layered material and about 10–200%, preferably about 20–80% carrier/solvent. The master gel can be later diluted and mixed with additional carrier or solvent to reduce the viscosity of the composition to a desired level.

The intercalates, and/or exfoliates thereof, are mixed with a carrier or solvent to produce viscous compositions of the carrier or solvent optionally including one or more active compounds, such as an antiperspirant compound, dissolved or dispersed in the carrier or solvent.

In accordance with an important feature of the present invention, a wide variety of topically-active compounds can be co-intercalated into a stable composition of the present invention when added to an intercalating composition together with or after (in a subsequent intercalating composition) the $C_6$+ alkyl or aromatic ring-containing intercalant surface modifier. Alternatively, the topically-active compound can be added to a water and/or solvent composition maintained stable by the intercalates and/or exfoliates of the present invention. Such topically active compositions include cosmetic, industrial, and medicinal compounds that act upon contact with the skin or hair, or are used to adjust rheology of industrial greases and the like. In accordance with another important feature of the present invention, a topically-active compound can be solubilized in the intercalating composition of the present invention or can be homogeneously dispersed throughout the composition as an insoluble, particulate material. In either case topically-effective compositions of the present invention are resistant to composition separation and effectively apply the topically-active compound to the skin or hair. If required for stability, a surfactant can be included in the composition, such as any disclosed in Laughlin, et al. U.S. Pat. No. 3,929,678, hereby incorporated by reference. In general, the topically-effective compositions of the present invention demonstrate essentially no phase separation if the topically-active compound is solubilized in the compositions. Furthermore, if the topically-active compound is insoluble in the composition, the composition demonstrates essentially no phase separation.

The topically-active compounds can be a cosmetically-active compound, a medically-active compound or any other compound that is useful upon application to the skin or hair. Such topically-active compounds include, for example, antiperspirants, antidandruff agents, antibacterial compounds, antifungal compounds, anti-inflammatory compounds, topical anesthetics, sunscreens and other cosmetic and medical topically-effective compounds.

Therefore, in accordance with an important feature of the present invention, the stable topically-effective composition can include any of the generally-known antiperspirant compounds such as finely-divided solid astringent salts, for example, aluminum chlorohydrate, aluminum chlorohydrox, zirconium chlorohydrate, and complexes of aluminum chlorohydrate with zirconyl chloride or zirconyl hydroxychloride. In general, the amount of the antiperspirant compound, such as aluminum zirconium tetrachlorohydrex glycine in the composition can range from about 0.01 to about 50%, and preferably from about 0.1% to about 30%, by weight of the total composition.

Other topically-active compounds can be included in the compositions of the present invention in an amount sufficient to perform their intended function. For example, zinc oxide, titanium dioxide or similar compounds can be included if the composition is intended to be a sunscreen.

Similarly, topically-active drugs, like antifungal compounds; antibacterial compounds; anti-inflammatory compounds; topical anesthetics; skin rash, skin disease and dermatitis medications; and anti-itch and irritation-reducing compounds can be included in the compositions of the present invention. For example, analgesics such as benzocaine, dyclonine hydrochloride, aloe vera and the like; anesthetics such as butamben picrate, lidocaine hydrochloride, zylocaine and the like; antibacterials and antiseptics, such as povidone-iodine, polymyxin b sulfate-bacitracin, zinc-neomycin sulfate-hydrocortisone, chloramphenicol, methylbenzethonium chloride, and erythromycin and the like; antiparasitics, such as lindane; deodorants, such as chlorophyllin copper complex, aluminum chloride, aluminum chloride hexahydrate, and methylbenzethonium chloride; essentially all dermatologicals, like acne preparations, such as benzoyl peroxide, erythromycin-benzoyl peroxide, clindamycin phosphate, 5,7-dichloro-8-hydroxyquinoline, and the like; anti-inflammatory agents, such as alclometasone dipropionate, betamethasone valerate, and the like; burn relief ointments, such as o-amino-p-toluenesulfonamide monoacetate and the like; depigmenting agents, such as monobenzone; dermatitis relief agents, such as the active steroids amcinonide, diflorasone diacetate, hydrocortisone, and the like; diaper rash relief agents, such as methylbenzethonium chloride and the like; emollients and moisturizers, such as mineral oil, PEG-4 dilaurate, lanolin oil, petrolatum, mineral wax and the like; fungicides, such as butocouazole nitrate, haloprogin, clotrimazole, and the like; herpes treatment drugs, such as 9-[(2-hydroxyethoxy)methyl]guanine; pruritic medications, such as alclometasone dipropionate, betamethasone valerate, isopropyl myristate MSD, and the like; psoriasis, seborrhea and scabicide agents, such as anthralin, methoxsalen, coal tar and the like; sunscreens, such as octyl p-(dimethylamino)benzoate, octyl methoxycinnamate, oxybenzone and the like; steroids, such as 2-(acetyloxy)-9-fluoro-1',2',3',4'-tetrahydro-11-hydroxypregna-1,4-dieno[16,17-b] naphthalene-3,20-dione, and 21-chloro-9-fluoro-1',2',3',4'-tetrahydro-11b-hydroxypregna-1,4-dieno[16z,17-b]naphthalene-3,20-dione. Any other medication capable of topical administration also can be incorporated in composition of the present invention in an amount sufficient to perform its intended function.

Eventual exfoliation of the intercalated layered material preferably should provide delamination of at least about 90% by weight of the intercalated material to provide a more viscous composition comprising a carrier or solvent having intercalant-complexed platelet particles substantially homogeneously dispersed therein. Some intercalates require a shear rate that is greater than about 10 sec$^{-1}$ for such relatively thorough exfoliation. Other intercalates exfoliate naturally or by heating, or by applying low pressure, e.g., 0.5 to 60 atmospheres above ambient, with or without heating. The upper limit for the shear rate is not critical. In the particularly preferred embodiments of the invention, when shear is employed for exfoliation, the shear rate is from greater than about 10 sec$^{-1}$ to about 20,000 sec$^{-1}$, and in the more preferred embodiments of the invention the shear rate is from about 100 sec$^{-1}$ to about 10,000 sec$^{-1}$.

When shear is employed for exfoliation, any method which can be used to apply a shear to the intercalant/carrier composition can be used. The shearing action can be provided by any appropriate method, as for example by mechanical means, by thermal shock, by pressure alteration, or by ultrasonics, all known in the art. In particularly useful procedures, the composition is sheared by mechanical methods in which the intercalate, with or without the carrier or solvent, is sheared by use of mechanical means, such as stirrers, Banbury® type mixers, Brabender® type mixers, long continuous mixers, and extruders. Another procedure employs thermal shock in which shearing is achieved by alternatively raising or lowering the temperature of the composition causing thermal expansions and resulting in internal stresses which cause the shear. In still other procedures, shear is achieved by sudden pressure changes in pressure alteration methods; by ultrasonic techniques in which cavitation or resonant vibrations which cause portions of the composition to vibrate or to be excited at different phases and thus subjected to shear. These methods of shearing are merely representative of useful methods, and any method known in the art for shearing intercalates may be used.

Mechanical shearing methods may be employed such as by extrusion, injection molding machines, Banbury® type mixers, Brabender® type mixers and the like. Shearing also can be achieved by introducing the layered material and intercalant at one end of an extruder (single or double screw) and receiving the sheared material at the other end of the extruder. The temperature of the layered material/intercalant composition, the length of the extruder, residence time of the composition in the extruder and the design of the extruder (single screw, twin screw, number of flights per unit length, channel depth, flight clearance, mixing zone, etc.) are several variables which control the amount of shear to be applied for exfoliation.

Exfoliation should be sufficiently thorough to provide at least about 80% by weight, preferably at least about 85% by weight, more preferably at least about 90% by weight, and most preferably at least about 95% by weight delamination of the layers to form two layer tactoids that include three platelets or, more preferably, individual platelet particles that can be substantially homogeneously dispersed in the carrier or solvent. As formed by this process, the platelet particles or platelet multi-layer tactoids dispersed in the carrier or solvent have the thickness of the individual layers plus one to five monolayer thicknesses of complexed, or small multiples less than about 10, preferably less than about 5 and more preferably less than about 3 of the layers, and still more preferably 1 or 2 layers. In the preferred embodiments of this invention, intercalation and delamination of every interlayer space is complete so that all or substantially all (less than about 2% by weight tactoids of more than one aggregated platelet) individual layers delaminate one from the other to form separate platelet particles for admixture with the carrier or solvent. The compositions can include the layered material as all intercalate, completely without exfoliation, initially to provide relatively low viscosities for transportation and pumping until it is desired to increase viscosity via easy exfoliation. In cases where intercalation is incomplete between some layers, those layers will not delaminate in the carrier or solvent, and will form platelet particles comprising those layers in a coplanar aggregate.

The effect of adding into a polar organic liquid carrier the nanoscale particulate dispersed platelet particles, derived from the intercalates formed in accordance with the present invention, typically is an increase in viscosity.

Molding compositions comprising a thermoplastic or thermosetting polymer containing a desired loading of platelets obtained from exfoliation of the intercalates manufactured according to the invention are outstandingly suitable for the production of sheets and panels having valuable properties. Such sheets and panels may be shaped by conventional processes such as vacuum processing or by hot pressing to form useful objects. The sheets and panels according to the invention are also suitable as coating materials for other materials comprising, for example, wood, glass, ceramic, metal or other plastics, and outstanding strengths can be achieved using conventional adhesion promoters, for example, those based on vinyl resins. The sheets and panels can also be laminated with other plastic films and this is preferably effected by co-extrusion, the sheets being bonded in the molten state. The surfaces of the sheets and panels, including those in the embossed form, can be improved or finished by conventional-methods, for example by lacquering or by the application of protective films.

Matrix polymer/platelet composite materials are especially useful for fabrication of extruded films and film laminates, as for example, films for use in food packaging. Such films can be fabricated using conventional film extrusion techniques. The films are preferably from about 10 to about 100 microns, more preferably from about 20 to about 100 microns and most preferably from about 25 to about 75 microns in thickness.

The homogeneously distributed platelet particles, exfoliated in accordance with the present invention, and matrix polymer that form the nanocomposites of one embodiment of the present invention are formed into a film by suitable film-forming methods. Typically, the composition is melted and forced through a film forming die. The film of the nanocomposite may go through steps to cause the platelets to be further oriented so the major planes through the platelets are substantially parallel to the major plane through the film. A method to do this is to biaxially stretch the film. For example, the film is stretched in the axial or machine direction by tension rollers pulling the film as it is extruded from the die. The film is simultaneously stretched in the transverse direction by clamping the edges of the film and drawing them apart. Alternatively, the film is stretched in the transverse direction by using a tubular film die and blowing the film up as it passes from the tubular film die. The films may exhibit one or more of the following benefits: increased modulus; increased wet strength; increased dimensional stability; decreased moisture adsorption; decreased permeability to gases such as oxygen and liquids, such as water, alcohols and other solvents.

The following specific examples are presented to more particularly illustrate the invention and are not to be construed as limitations thereon.

Four intercalants were synthesized having a pyrrolidone electrostatic (interlayer platelet cation-complexing) functionality at one end and a $C_6+$ alkyl and aromatic ring-containing compound having a matrix material-compatible and reactive functionality ($C_6+$ amine or $C_6+$ carboxylic acid or N-phenyl carboxylic acid) at a free (non-$Na^+$ complexed) end, as follows:

EXAMPLE 1

Synthesis of AHP (N-(6-aminohexyl)-2-pyrrolidone):

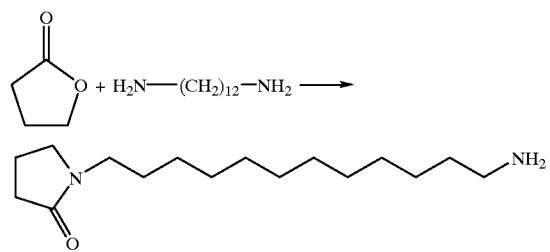

Hexamethylenediamine (100 g, 0.86 mole) was heated with γ-butyrolactone (23.36 ml, 0.31 mole) at 210° C. under nitrogen for 24 hours in a three-neck reaction flask equipped with air reflux condenser. After the reaction, most of the unreacted diamine was crystallized upon cooling to room temperature; therefore, most of the excess diamine was filtered off. The remaining unreacted diamine in solution was vacuum distilled, then N-(6-aminohexyl)-2-pyrrolidone was obtained at 140° C. (0.9 torr) as a colorless liquid. Yield: 35 g (62%). Mass Spectra: m/e (relative intensity) 185(M+ 1+, 16.97).

EXAMPLE 2

Synthesis of N-(12-aminododecyl)-2-pyrrolidone (ADDP):

1,12-diaminedodecane (100 g, 0.50 mole) was reacted with γ-butyrolactone (13.86 ml, 0.18 mole) at 210° C. under similar procedure of AHP preparation. Upon cooling to room temperature, the reaction mixture was solidified as white solid. Mass Spectra: m/e (relative intensity) 269(M+ 1+, 18.50).

EXAMPLE 3

Synthesis of N-oleyl-2-pyrrolidone (OP):

-continued

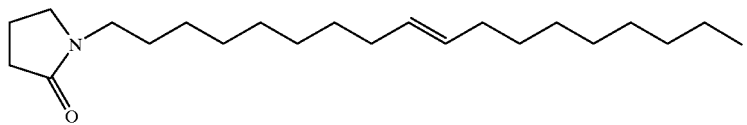

Oleylamine (125 g, tech grade, 80% pure, 0.374 mole) was heated with γ-butyrolactone (27 ml, 0.35 mole) at 180° C. under nitrogen for 24 hours. The product was purified via vacuum distillation as a light yellow waxy solid. Mass Spectra: m/e (relative intensity) 335 ($M^+$, 28.40).

EXAMPLE 4

Synthesis of 4-(2-oxo-pyrrolidin-1-yl)-benzoic acid:

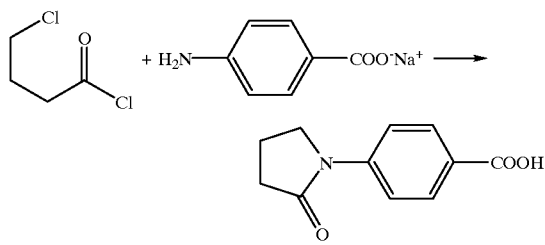

Sodium 4-aminobenzoate (42.5 g, 0.267 mol) was suspended in 250 ml benzene. To this solution, upon vigorous stirring, 4-chlorobutyryl chloride (29 ml, 0.248 mol) was added slowly. The temperature of the reaction mixture was heated to 60° C. It is at 60° C. that the reaction was continued for another 20 hours. $Na_2CO_3$ solution (20%, 600 ml) was then added and the benzene layer was separated. The aqueous layer was acidified and the white precipitate was filtrated and recrystallized from methanol to form colorless crystal of 4-(2-oxo-pyrrolidin-1-yl)-benzoic acid. Mass Spectra: m/e (relative intensity) 205($M^+$, 44.23).

EXAMPLE 5

Figure 8:
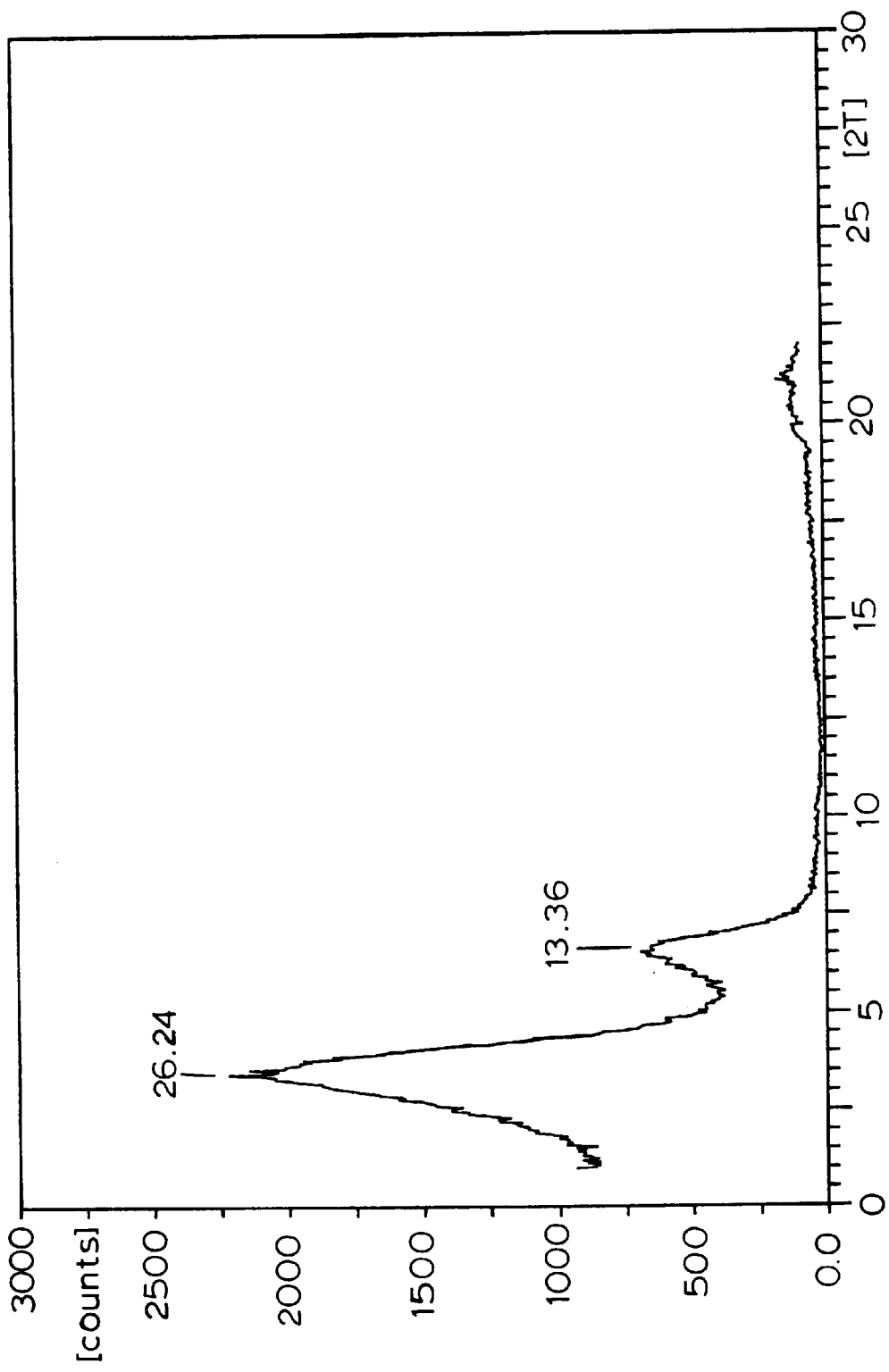
FIG. 8 is an x-ray diffraction pattern for a complex of N-(12-aminododecyl)-2-pyrrolidone and calcium montmorillonite clay, in a molar ratio of 4:1, respectively.

This example illustrates the intercalation of N-(12-aminododecyl)-2-pyrrolidone (Example 2) with montmorillonite clay. 500 g of Ca-montmorillonite slurry (4.28 wt %) was heated to 75–80° C. The weight of clay was 21.4 g. 13.8 g of N-(12-aminododecyl)-2-pyrrolidone (molar ratio N-(12-aminododecyl)-2-pyrrolidone to $Ca^{2+}$=4:1) was added to the clay slurry and mixed thoroughly at 75–80° C. for 30 minutes. The clay started to flocculate and was separated by filtration under vacuum and dried at 75° C. The XRD results of the dried N-(12-aminododecyl)-2-pyrrolidone-Ca-montmorillonite complex show a basal spacing of 26.2 Å (FIG. 8).

EXAMPLE 6

Figure 9:
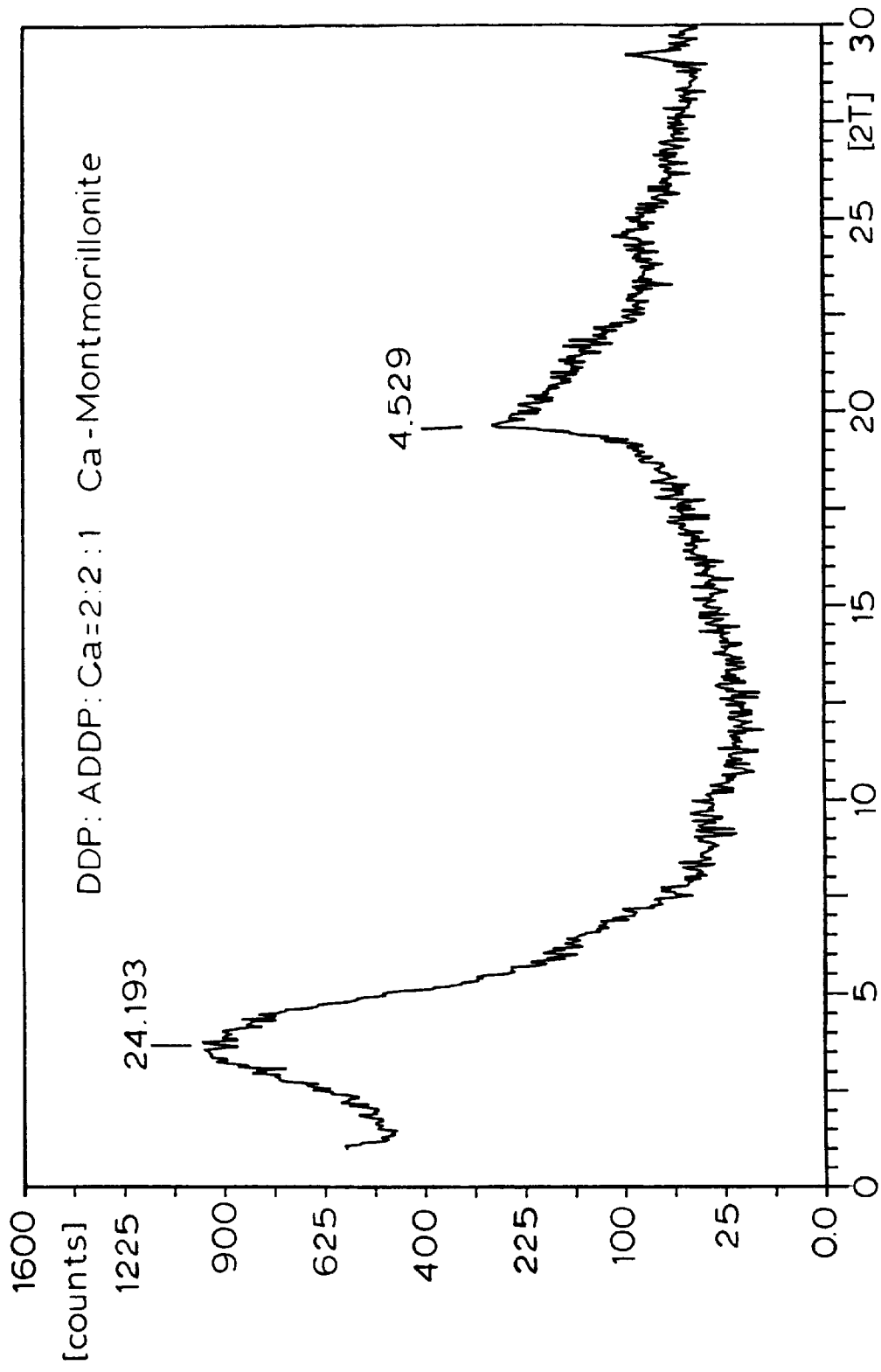
FIG. 9 is an x-ray diffraction pattern for a complex of two co-intercalates: N-(12-aminododecyl)-2-pyrrolidone (ADDP) and N-dodecyl-2-pyrrolidone (DDP) complexed with calcium montmorillonite clay in a molar ratio of 2:2:1, respectively.
Figure 10:
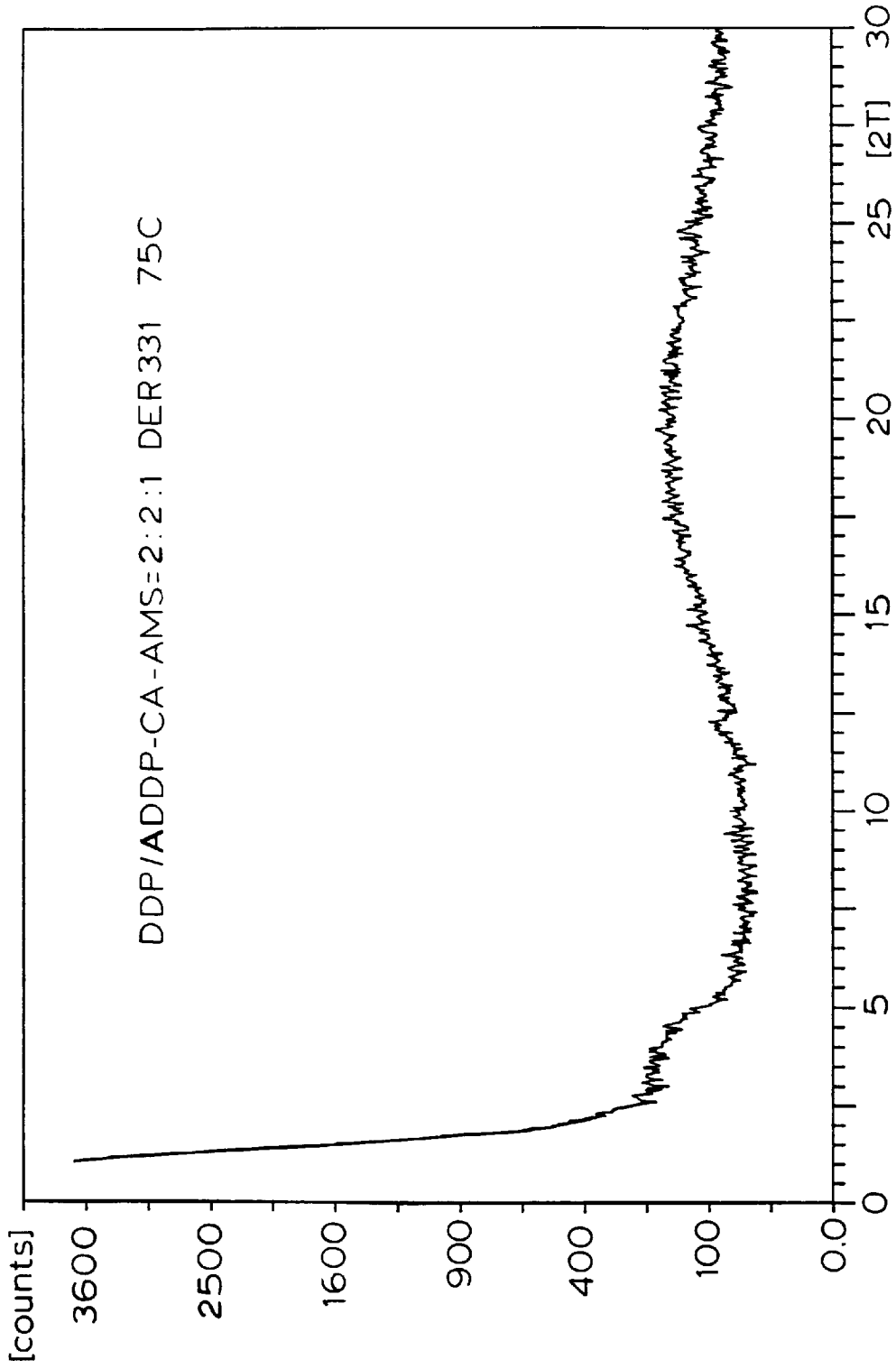
FIG. 10 is an x-ray diffraction pattern for the complex of FIG. 9 mixed into an expoxy resin (DER 331) polymer melt (matrix polymer) to form a nanocomposite, showing that the intercalate was almost completely exfoliated when mixed into the polymer melt.

This example illustrates the co-intercalation of N-(12-aminododecyl)-2-pyrrolidone (Example 2) and N-dodecyl-2-pyrrolidone with montmorillonite clay. 500 g of Ca-montmorillonite slurry (4.28 wt %) was heated to 75–80° C. 6.49 g of N-dodecyl-2-pyrrolidone (2:1 ratio to $Ca^{2+}$) was added to the clay slurry used in Example 5 and mixed thoroughly at 75–80° C. for 30 minutes. 6.9 g of N-(12-aminododecyl)-2-pyrrolidone was added to the previous clay slurry and mixed thoroughly at 75–80° C. for another 30 minutes. The clay was separated by filtration and dried at 75° C. X-ray diffraction (XRD) results indicate that N-(12-aminododecyl)-2-pyrrolidone and N-dodecyl-2-pyrrolidone co-intercalated into the clay gallery with basal spacing of 24.2 Å (FIG. 9). 5 g of the N-(12-aminododecyl)-2-pyrrolidone and N-dodecyl-2-pyrrolidone co-intercalated into Ca-montmorillonite was mixed with 45 g of DER 331 and mixed at 75° C. The clay complex was dispersed well in the resin and XRD result indicates that the clay complex was nearly completely exfoliated in the resin (FIG. 10).

EXAMPLE 7

Figure 11:
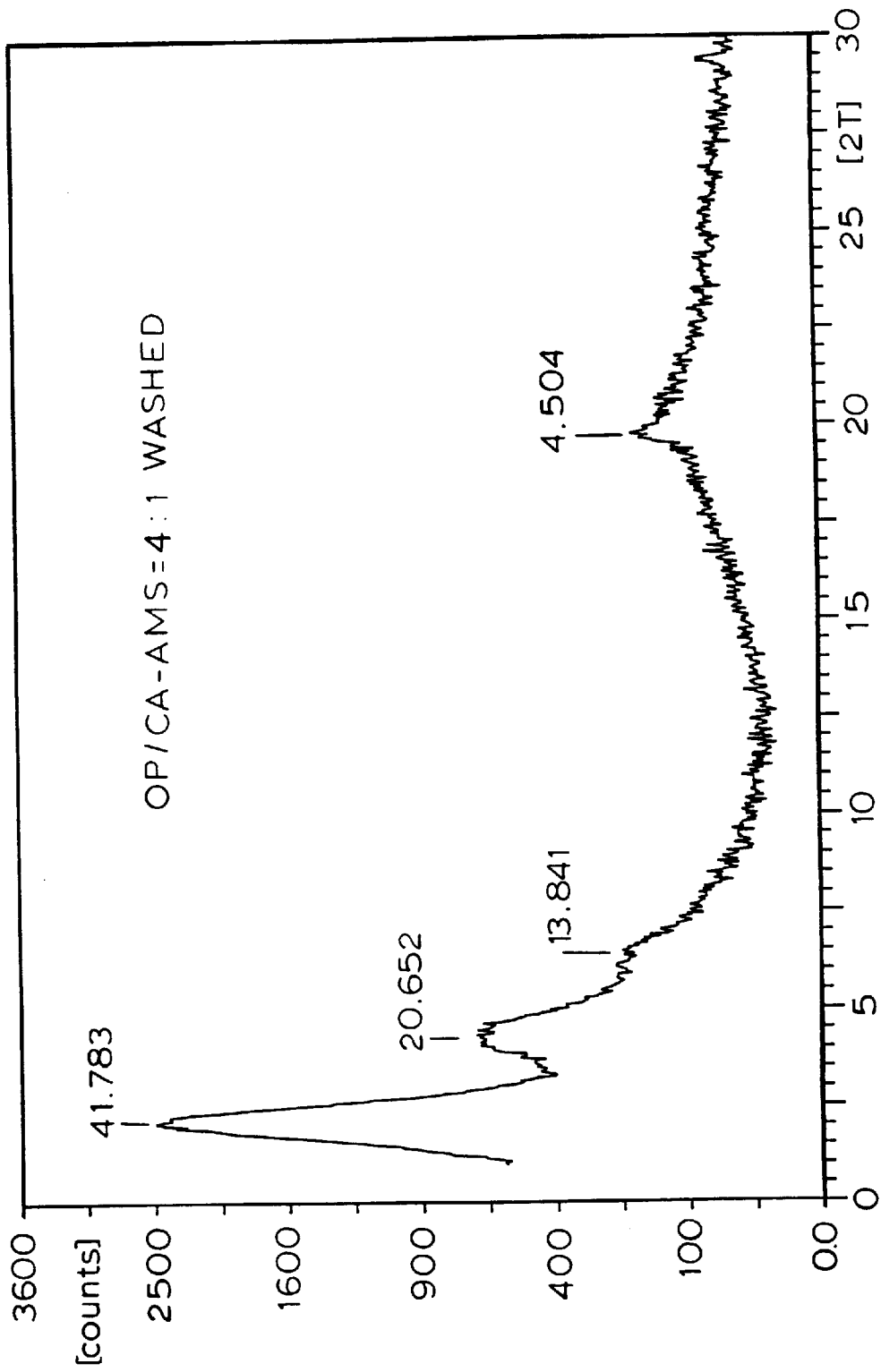
FIG. 11 is an x-ray diffraction pattern for a complex of n-oleyl-2-pyrrolidone and calcium montmorillonite clay in a molar ratio of 4:1, respectively, showing a basal spacing of about 41.8 Å.

This example illustrates the intercalation of N-oleyl-2-pyrrolidone (Example 3) into Ca-montmorillonite and exfoliation of the N-oleyl-2-pyrrolidone-Ca-montmorillonite complex in styrene monomers. 500 g of Ca-montmorillonite slurry (4.28 wt %) was heated to 75–80° C. The weight of clay was 21.4 g. 21.5 g (molar ratio N-oleyl-2-pyrrolidone to $Ca^{2+}$=4:1) of the light yellow waxy solid of N-oleyl-2-pyrrolidone was added to the clay slurry and mixed thoroughly at 75–80° C. for 30 minutes. The clay started to flocculate and was separated by filtration under vacuum and dried at 75° C. The XRD results of the dried N-oleyl-2-pyrrolidone-Ca-montmorillonite complex has a basal spacing at 41.8 Å (FIG. 11). For comparison, the non-functionalized 1-octadecyl-2-pyrrolidone, with 4:1 ratio to $Ca^{2+}$ forms a similar complex with Ca-montmorillonite and has a basal spacing of 40.7 Å. 5 g of the N-oleyl-2-pyrrolidone-Ca-montmorillonite complex was placed into 95 g styrene monomer and the mixture was blended with a blender. A styrene-clay complex gel was formed and XRD indicates the clay complex was exfoliated in the monomer. Subsequent polymerization of the monomer should give an exfoliated nanocomposite with the gallery cation complex chemically linked with the matrix polymer. The styrene-clay complex gel can also be mixed with unsaturated polyester resin and polymerized to give a nanocomposite.

Numerous modifications and alternative embodiments of the invention will be apparent to those skilled in the art in view of the foregoing description. Accordingly, this description is to be construed as illustrative only and is for the purpose of teaching those skilled in the art the best mode of carrying out the invention. The details of the process may be varied substantially without departing from the spirit of the invention, and the exclusive use of all modifications which come within the scope of the appended claims is reserved.

What is claimed is:

1. An intercalate, capable of being exfoliated, formed by contacting a layered materials with an intercalant monomer, oligomer or polymer surface modifier selected from the group consisting of a compound having an alkyl radical containing at least 6 carbon atoms, a compound containing an aromatic ring, and mixtures thereof to form an intercalating composition, said surface modifier including a matrix material-reactive functional group, said intercalate having a molar ratio of intercalant surface modifier to interlayer cations of at least about 1:5, to achieve sorption and complexing of the intercalant surface modifier between adjacent spaced layers of the layered material to expand the spacing between a predominance of the adjacent platelets of said layered material at least about 10 Å, when measured after sorption of intercalant surface modifier.

2. An intercalate in accordance with claim 1, wherein the concentration of intercalant surface modifier in said intercalating composition is at least about 0.1% by weight, based on the weight of water organic solvent for the surface modifier, and intercalant surface modifier in the intercalating composition, and said sorption of the intercalant surface modifier is achieved without first reacting the layered material with an onium ion or silane coupling agent.

3. An intercalate in accordance with claim 2, wherein the layered material is contacted with a second intercalant selected from the group consisting of a monomer, an oligomer, a polymer, and a mixture thereof, and wherein the concentration of second intercalant in an intercalating composition is at least about 1% by weight.

4. An intercalate in accordance with claim 3, wherein the concentration of the second intercalant in said intercalating composition is at least about 2% by weight.

5. An intercalate in accordance with claim 4, wherein the concentration of the second intercalant in said intercalating composition is at least about 30% by weight.

6. An intercalate in accordance with claim 4, wherein the concentration of the second intercalant in said intercalating composition in the range of about 10% to about 60% by weight.

7. An intercalate in accordance with claim 5, wherein the concentration of the second intercalant in said intercalating composition in the range of about 50% to about 90% by weight.

8. An intercalate in accordance with claim 3, wherein the concentration of the second intercalant in the intercalating composition is at least about 10% by weight, based on the dry weight of the layered material contacted.

9. An intercalate in accordance with claim 8, wherein the concentration of the second intercalant in the intercalating composition is in the range of about 16% to about 70% by weight, based on the dry weight of the layered material contacted.

10. An intercalate in accordance with claim 9, wherein the concentration of the second intercalant in the intercalating composition is in the range of about 16% to less than about 35% by weight, based on the dry weight of the layered material contacted.

11. An intercalate in accordance with claim 9, wherein the concentration of the second intercalant in the intercalating composition is in the range of about 35% to less than about 55% by weight, based on the dry weight of the layered material contacted.

12. An intercalate in accordance with claim 9, wherein the concentration of the second intercalant in the intercalating composition is in the range of about 55% to less than about 200% by weight, based on the dry weight of the layered material contacted.

13. A method of exfoliating a phyllosilicate comprising:
contacting the phyllosilicate, with a composition comprising at least about 2% by weight of an intercalant surface modifier selected from the group consisting of a compound having an alkyl radical containing at least 6 carbon atoms, a compound containing an aromatic ring, and mixtures thereof to form an intercalating composition, said surface modifier including a matrix-reactive functional group, to achieve intercalation of said surface modifier between said adjacent phyllosilicate platelets in an amount sufficient to space said adjacent phyllosilicate platelets a distance of at least about 10 Å; and
separating the platelets of the intercalated phyllosilicate.

14. The method of claim 13, wherein said intercalating composition includes a water carrier comprising about 5% to about 50% by weight water, based on the total weight of said intercalating composition.

15. The method of claim 14, wherein said intercalating composition comprises about 10% to about 40% by weight water.

16. The method of claim 13, wherein the intercalating composition further includes a second intercalant selected from the group consisting of a polymerizable monomer, a polymerizable oligomer, a polymer, and a mixture thereof, wherein the concentration of second intercalant in said intercalating composition is at least about 1% by weight.

17. The method of claim 13, wherein the surface modifier is included in an intercalating composition in a concentration of about 10–200% by weight, based on the dry weight of the phyllosilicate in the intercalating composition.

18. An intercalate in accordance with claim 1, wherein the amount of intercalant surface modifier intercalated into the phyllosilicate material is 10–200% based on the dry weight of the phyllosilicate material, and said intercalation is achieved without first reacting the layered material with an onium ion or silane coupling agent.

19. An intercalate in accordance with claim 18, wherein the amount of intercalant surface modifier intercalated into the phyllosilicate material is about 15% to about 80%, based on the dry weight of the phyllosilicate material.

20. An intercalate in accordance with claim 19, wherein the molar ratio of intercalated surface modifier to interlayer phyllosilicate cations is from about 1:1 to 1:5.

21. An intercalate in accordance with claim 16, wherein the weight ratio of the second intercalant to phyllosilicate material is from about 20 grams of second intercalant per 100 grams of phyllosilicate material to about 80 grams of second intercalant per 100 grams of phyllosilicate material.

22. An intercalate in accordance with claim 1, wherein the weight ratio of intercalant surface modifier to phyllosilicate material in the intercalating composition is in the range of 1:1 to 1:5.

23. A method in accordance with claim 13, wherein the amount of intercalant surface modifier intercalated into the phyllosilicate material is 10–200% intercalant surface modifier, based on the dry weight of the phyllosilicate material.

24. A method in accordance with claim 23, wherein the amount of intercalant surface modifier intercalated into the phyllosilicate material is about 15% to about 80%, based on the dry weight of the phyllosilicate material.

* * * * *